US011343220B2

(12) United States Patent
Anerella et al.

(10) Patent No.: US 11,343,220 B2
(45) Date of Patent: May 24, 2022

(54) USER ENGAGEMENT WITH CO-USERS OF A NETWORKING SYSTEM

(71) Applicant: Facebook, Inc., Menlo Park, CA (US)

(72) Inventors: Jessica Marie Anerella, Menlo Park, CA (US); Tala Huhe, San Francisco, CA (US); Alina Luk, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 269 days.

(21) Appl. No.: 16/539,508

(22) Filed: Aug. 13, 2019

(65) Prior Publication Data

US 2020/0329005 A1    Oct. 15, 2020

Related U.S. Application Data

(60) Provisional application No. 62/832,211, filed on Apr. 10, 2019.

(51) Int. Cl.
*H04L 51/52* (2022.01)
*G06F 16/9536* (2019.01)
(Continued)

(52) U.S. Cl.
CPC .......... *H04L 51/32* (2013.01); *G06F 16/9536* (2019.01); *H04L 51/046* (2013.01); *H04L 51/12* (2013.01)

(58) Field of Classification Search
CPC ....... H04L 51/32; H04L 51/046; H04L 51/12; G06F 16/9536
See application file for complete search history.

(56) References Cited

U.S. PATENT DOCUMENTS 7,895,279 B2 * 2/2011 Forstall ................. H04L 51/00
709/206
10,467,233 B2 * 11/2019 Lewis ............... G06F 16/24578
(Continued)

OTHER PUBLICATIONS

Reiss, "All About Facebook's New Message Request Feature", Nov. 18, 2015, Gambit Nash, "https://gambitnash.co.uk/blog/2015/11/18/facebooks-new-message-request-feature/" (Year: 2015).*
(Continued)

*Primary Examiner* — Hitesh Patel
*Assistant Examiner* — Eui H Kim
(74) *Attorney, Agent, or Firm* — Keller Preece PLLC

(57) ABSTRACT

The present disclosure relates to systems, non-transitory computer-readable media, and methods for improving and streamlining user engagement with co-users within a networking system. For instance, the user engagement system can detect co-user engagement with a user of a networking system. Based on one or more metrics, such as characteristics of the engaging co-user, the type of detected co-user engagement, or engagement history with the user, the user engagement system can rank, prioritize, and/or aggregate the engagement notifications. For example, the user engagement system can prioritize message requests from co-users with whom the user has not actively engaged on the networking system. In another example, the user engagement system can filter messages from co-users with whom the user has actively engaged in to one of multiple message repositories.

20 Claims, 22 Drawing Sheets

(51) Int. Cl.
*H04L 51/046* (2022.01)
*H04L 51/00* (2022.01)

(56) References Cited

U.S. PATENT DOCUMENTS

| | | | |
|---|---|---|---|
| 2003/0195937 A1* | 10/2003 | Kircher, Jr. | H04L 67/306 709/207 |
| 2009/0144377 A1* | 6/2009 | Kim | G06Q 10/10 709/206 |
| 2015/0113436 A1* | 4/2015 | Penha | G06F 3/0485 715/752 |
| 2016/0036887 A1* | 2/2016 | Ilic | H04L 67/22 709/206 |
| 2018/0032898 A1* | 2/2018 | Wu | G06N 20/00 |
| 2018/0349011 A1* | 12/2018 | Morag | G06F 21/604 |
| 2018/0373802 A1 | 12/2018 | Deng et al. | |

OTHER PUBLICATIONS

Kim, Larry, "The Straightforward Guide to Twitter Analytics" Jan. 23, 2019, hubspot, "https://blog.hubspot.com/marketing/twitter-analytics" (Year: 2019).*

Hayes, Mark, "YouTube Analytics: 10 Key Metrics to Track and Improve Video Performance", Jan. 10, 2018, Shopify Blog, "https://www.shopify.com/blog/6763696-youtube-analytics-10-ways-to-track-video-performance" (Year: 2018).*

Couch, Aaron, "How Are You Doing on Instagram? These Websites Will Tell You", Jan. 13, 2015, Make Use of, "https://www.makeuseof.com/tag/instagram-websites-will-tell/" (Year: 2015).*

International Search Report and Written Opinion as received in PCT/US2020/026196 dated May 28, 2020.

* cited by examiner

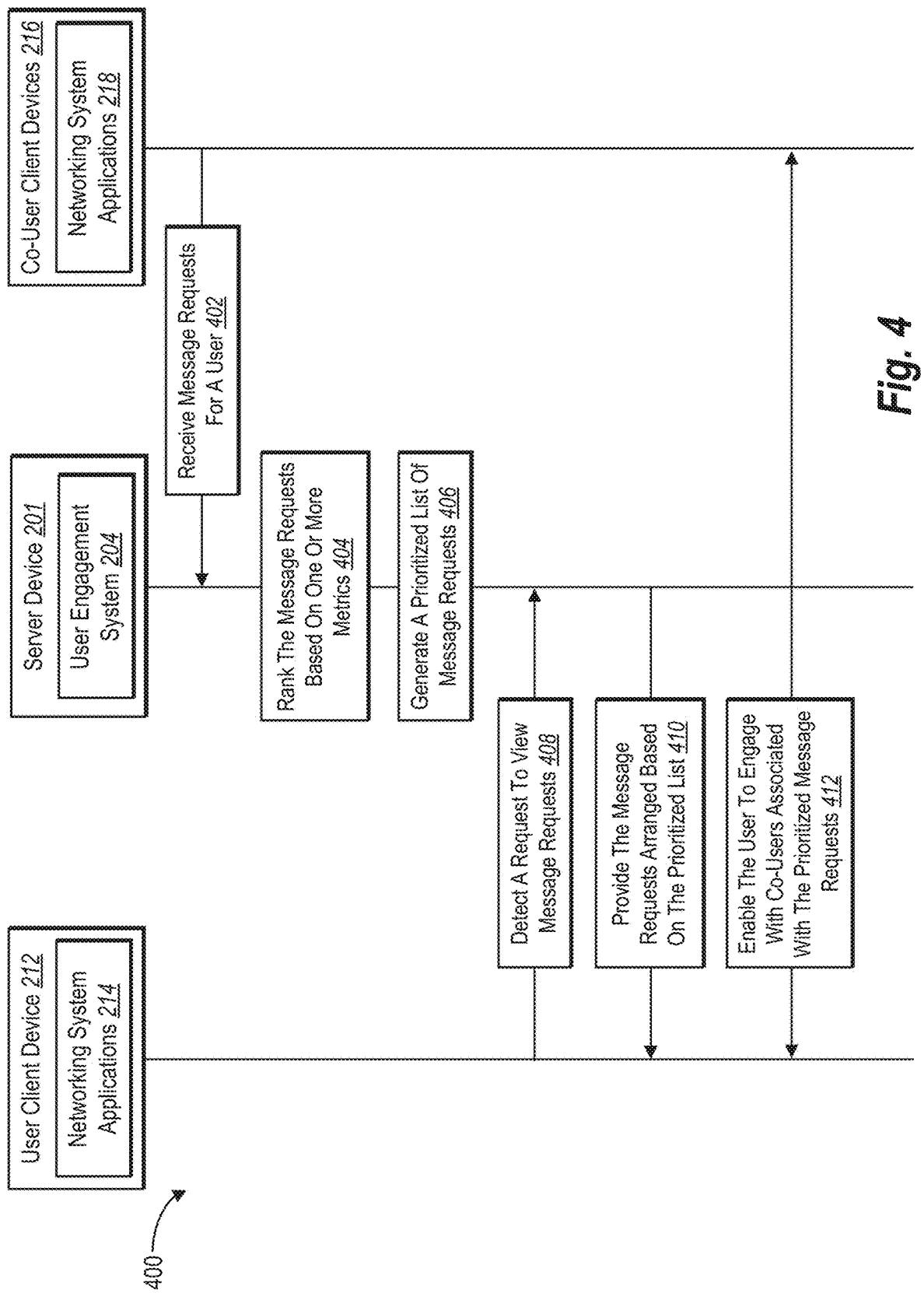

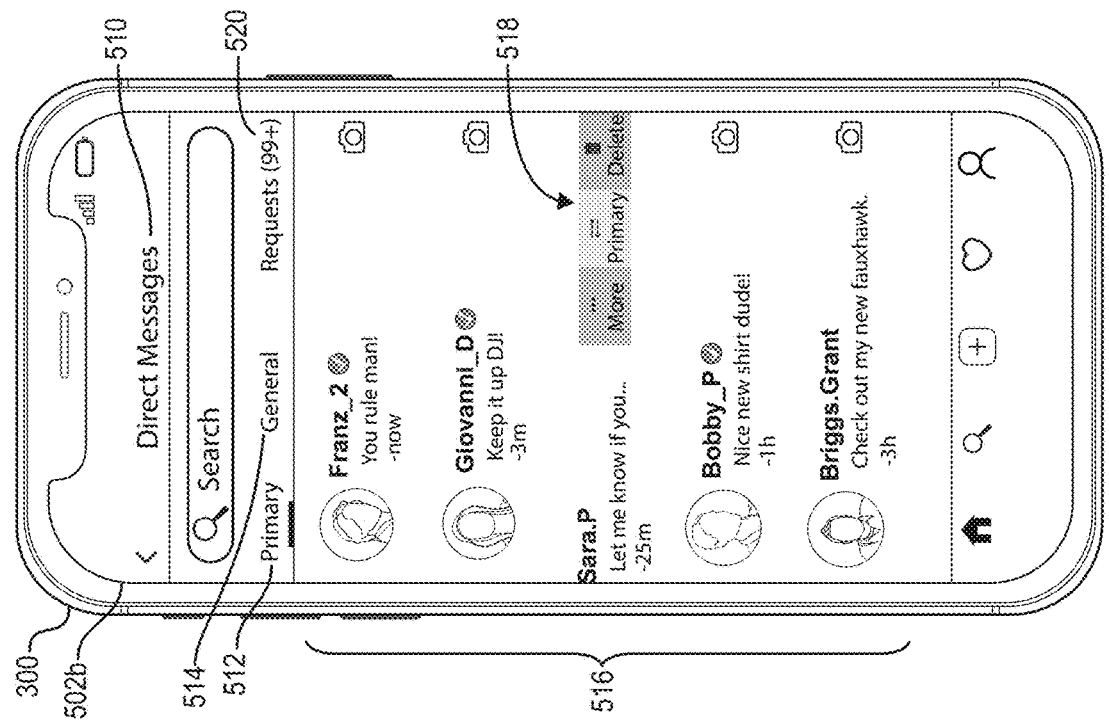
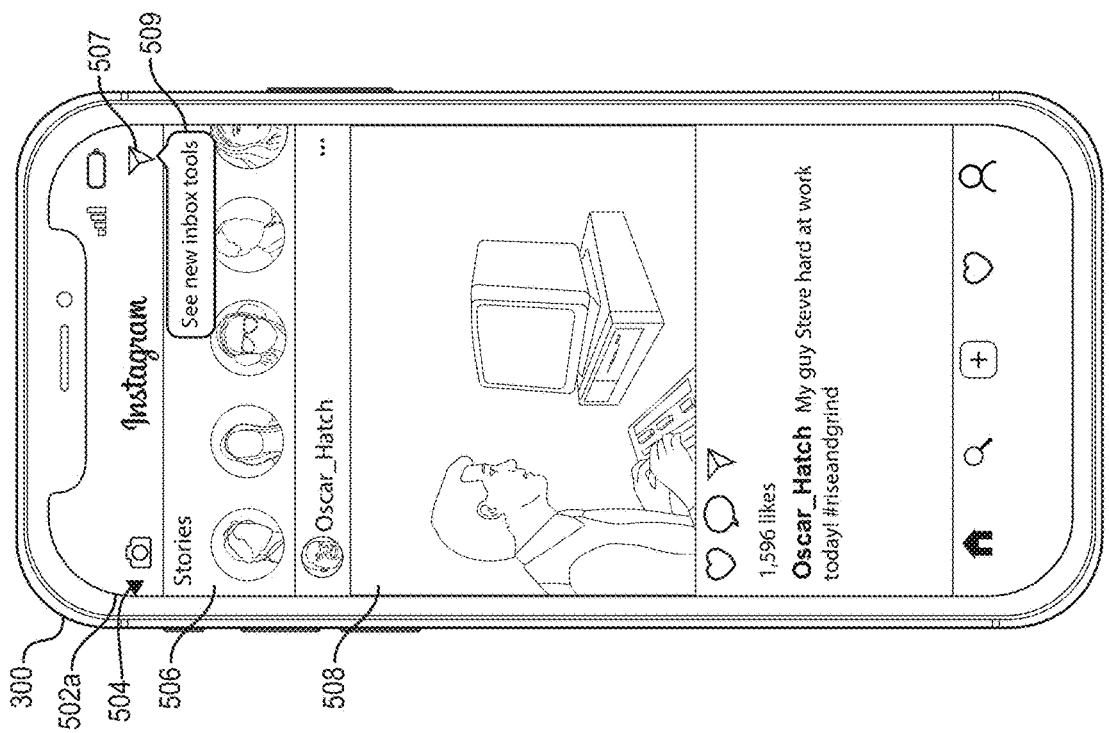
Fig. 5A
Fig. 5B

USER ENGAGEMENT WITH CO-USERS OF A NETWORKING SYSTEM

CROSS-REFERENCE TO RELATED APPLICATIONS

This application claims the priority to and the benefit of U.S. Provisional Patent Application No. 62/832,211, filed Apr. 10, 2019, which is incorporated herein by reference in its entirety.

BACKGROUND

Recent years have seen significant technological improvements in hardware and software platforms for sharing digital media and engaging with other users. Indeed, conventional networking systems (e.g., social networking systems) can facilitate users sharing content items with co-users as well as engaging with co-users with respect to content items shared via the networking system. Moreover, conventional systems enable users to establish and grow a following of co-users in connection with the content items shared by the users over the networking system.

Despite these advancements, conventional networking systems have a number of problems in relation to usability, flexibility, efficiency, security, and accuracy of operations. In particular, conventional systems struggle with these issues for users having large numbers of followers within a networking system.

As a first example, regarding usability, conventional systems have inefficient graphical user interfaces and user experiences. To illustrate, many conventional systems require that a user perform excessive user interactions to access, view, engage with, and respond to co-users of the networking system that have engaged with content items posted by the user. Indeed, cluttered, bulky, and navigationally intense interfaces discourage users from engaging back with the co-users.

As another example, some conventional systems provide users with interfaces that include an overabundance of co-user engagement and interaction notifications, which commonly overwhelm the user. Further, the number of less important notifications considerably outweigh more important notifications. Thus, when a user receives a large number of these notifications, conventional systems can cause a user to ignore most notifications in attempts to reduce congestion and overload. Indeed, conventional systems often result in less important notifications pushing out more meaningful notifications.

Regarding efficiency, in providing an overabundance of engagement notifications, conventional systems inefficiently waste computing resources and storage capacity across multiple computing devices. To illustrate, for a user having a large number of followers, conventional systems process, publish, and store hundreds or thousands of engagement notifications for each content item shared by the user. The collective amount of engagement notifications across multiple users requires massive computing resources and storage capacity at the server devices associated with these conventional systems. Further, the limited storage on mobile client devices of users is often at filled with irrelevant notifications.

Conventional systems are also inflexible. To illustrate, many conventional systems are inflexible in how users are able to engage with their followers. For example, conventional systems force many users to select settings that cause users to misrepresent themselves to co-users of the networking system. More particularly, the account types offered by conventional systems are ill-suited to the needs of most users. Because of this rigidity, users are forced to select an account type that is misrepresentative to their co-users. Additionally, because these account types are designed for different purposes, many of the user's needs are left unmet. Further, a large number of features and options offered by conventional systems are not utilized, and in fact are wasted, because users have different needs.

Moreover, conventional networking systems also have shortfalls in relation to digital security and accuracy. For example, conventional systems often fail to provide users with accurate account measurements regarding followers, content items, and co-user engagement. As a result, users provide their credentials to third-party services to view account measurements. However, digital privacy and security concerns have surfaced due to third-party services having access to a user's information. Further, in the majority of cases, these third-party services provide inaccurate and overgeneralized account measurements to users.

These along with additional problems and issues exist with regard to conventional networking systems.

SUMMARY

Embodiments of the present disclosure provide benefits and/or solve one or more of the foregoing or other problems with systems, non-transitory computer-readable media, and methods for improving user engagement with co-users of a networking system. For instance, the disclosed systems can intelligently detect, rank, prioritize, aggregate, and present engagement notifications to a user in an accurate, efficient, and streamlined manner. Accordingly, the user is not overwhelmed with engagement notifications and discouraged from using the networking system or responding to co-users. In addition, the disclosed systems flexibly provide users with multiple account types and options that improve the ability of the user to engage with co-users of the networking system. Further, the disclosed systems securely provide users with accurate account insights that enable users to efficiently grow their following.

To illustrate, in one or more embodiments, the disclosed systems receive a large number of message requests from co-users of the networking system with whom the user has not actively engaged on the networking system. Based on receiving the message requests, the disclosed systems can rank the message requests utilizing one or more metrics. For instance, the disclosed systems rank the message requests in part, based on co-users associated with the message requests. In addition, the disclosed systems can generate a prioritized list of message requests based on the ranking of the message requests. Further, the disclosed systems can display top prioritized message requests to the user within a graphical user interface based on one or more prioritized lists of message requests.

Additional features and advantages of one or more embodiments of the present disclosure are provided in the description which follows, and in part will be apparent from the description, or may be learned by the practice of such example embodiments.

BRIEF DESCRIPTION OF THE DRAWINGS

The detailed description provides one or more embodiments with additional detail through the use of the accompanying drawings, as briefly described below.

FIG. 4 illustrates a sequence diagram of prioritizing engagement message requests in accordance with one or more embodiments.

FIGS. 5A-5E illustrate the computing device with a user interface portraying prioritized engagement message requests in accordance with one or more embodiments.

DETAILED DESCRIPTION

Figure 1:
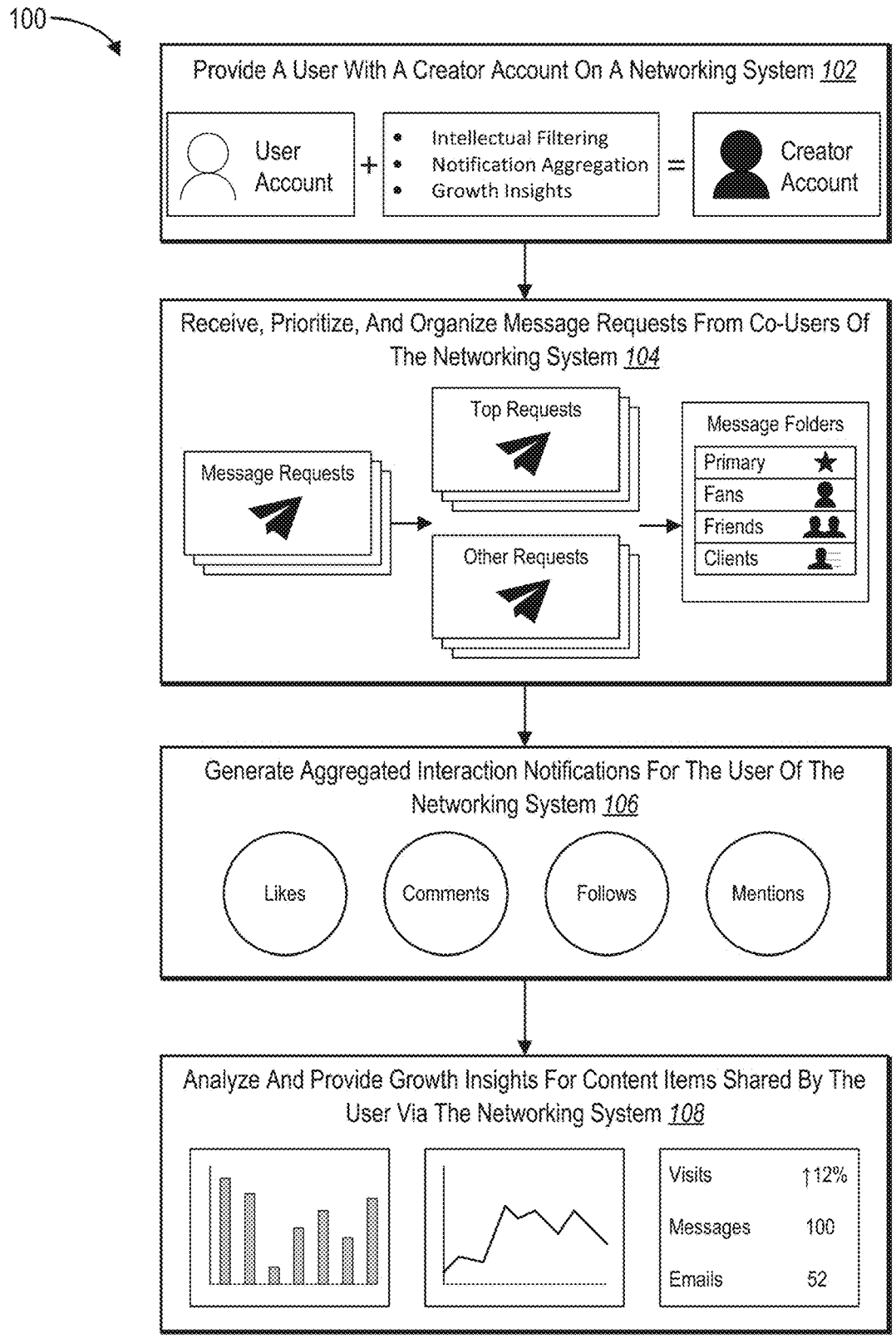
FIG. 1 illustrates a diagram of an overview of improving user engagement with co-users within a networking system utilizing novel user engagement tools in accordance with one or more embodiments.

One or more embodiments of the present disclosure include a user engagement system that improves and streamlines user engagement with co-users within a networking system. For instance, the user engagement system can rank, prioritize, and/or aggregate notifications associated with co-users engaging with the user via the networking system. In particular, the user engagement system can prioritize message requests from co-users with whom the user has not actively engaged on the networking system based on one or more metrics. In another example, the user engagement system can filter messages from co-users with whom the user has actively engaged in to one of multiple message repositories.

To illustrate, in one or more embodiments, the user engagement system receives numerous message requests from co-users of the networking system with whom the user has not actively engaged on the networking system. Additionally, the user engagement system ranks the message requests utilizing one or more metrics. For instance, the disclosed systems rank the message requests in part, based on co-users associated with the message requests. In some embodiments, the user engagement system generates a prioritized list of message requests based on the ranking of the message requests. Further, the user engagement system can display top prioritized message requests to the user within a graphical user interface based on a prioritized list of message requests.

As mentioned above, the user engagement system improves and streamlines user engagement with co-users within a networking system. In particular, the user engagement system provides improvements to users that have a large following by co-users of the networking system. For example, in various embodiments, the user engagement system enables users to choose an account type (e.g., a creator account) to better engage with their followers while not misrepresenting the users (e.g., improperly holding the user out as a business). Indeed, the user engagement system enables users to flexibly specify an account type as well as one or more sub-account types that best suit users' needs.

In addition, the user engagement system provides tools in connection with the flexible account types that facilitate improved co-user engagement. For example, the user engagement system enables users to determine which contact information to include on their profiles as well as when to show their contact information. Further, the user engagement system provides simplified messaging, aggregated notifications, as well as secure and accurate growth tools and analytics.

As mentioned above, the user engagement system can provide simplified messaging. Indeed, in one or more embodiments, the user engagement system provides simplified messaging through improved prioritization of message requests from co-users whom the user has not actively engaged on the networking system. For example, in some embodiments, the user engagement system ranks these message requests based on one or more metrics. In some instances, the metrics include the content item types associated with the message requests, the message content of the message requests, or the timestamps of the message requests. In additional instances, the metrics focus on co-users associated with the message requests and include the number of followers of the co-user associated with a message request, the number of posts by the co-user, the verification status of the co-user, the activity history of the co-user, the account type of the co-user, previous co-user interactions with content items shared by the user, and/or an affinity between the co-user and the user.

Additionally, in various embodiments, the user engagement system provides the user with a simplified process of viewing, accepting, organizing, and engaging with message requests. For example, as mentioned above, the user engagement system provides the prioritized list of message requests showing the most relevant message requests first. Further, upon selecting a message request from the prioritized list, the user engagement system provides a user with options to view the corresponding message, accept the request, and move the message to a user-selected message repository.

As another example, in various embodiments, the user engagement system provides simplified messaging by streamlining messages from users whom the user has actively engaged on the networking system into message repositories. For example, the user engagement system maintains multiple message repositories that sort and organize messages from co-users with whom the user has actively engaged. In some embodiments, the user engagement system can prioritize message repositories, such as when the number of unread messages in the message repository exceeds a threshold number.

As mentioned above, the user engagement system provides improved user engagement through aggregated interaction notifications within a user's activity feed. For example, in response to a user with a large following sharing a content item, the user is often immediately bombarded with hundreds or thousands of interaction notifications (e.g., likes and comments), often rendering the user's activity feed unusable. Accordingly, the user engagement system detects and aggregates multiple interaction notifications into a single notification. Further, the user engagement system can identify interaction notifications from co-users important to the user and individually show these interaction notifications in the user's activity feed along with the aggregated interaction notifications.

Also, as mentioned above, the user engagement system provides secure and accurate growth insights, tools, and analytics to users. For example, in one or more embodiments, the user engagement system detects and accurately determines unique counts of co-users that start or stop following a user. Further, the user engagement system can provide growth insights at various levels of granularity (e.g., month, week, day, hour) unachieved by conventional systems. Similarly, the user engagement system provides growth insights at a per-post or a per-day level in a single interface for multiple content item types. Moreover, the user engagement system does not require a user to compromise their privacy or bypass security measures of the networking system by permitting third-party services access to their networking system user account.

As explained above, the digital transcription system provides numerous advantages, benefits, and practical applications over conventional systems and methods. For instance, the user engagement system eliminates excessive user client device interactions by providing prioritized, aggregated, and sorted co-user interaction notifications. In particular, the user engagement system reduces the number of interactions required by a user that is attempting to view, access, and respond to co-user engagement requests. Indeed, the user engagement system streamlines user interfaces and surfaces the most relevant co-user engagement requests, which prevent the user from scrolling or navigating through numerous interfaces to identify and respond to an engagement request.

In some embodiments, the user engagement system eliminates excessive user client device interactions by aggregating interaction notifications. More particularly, the user engagement system combines notifications by co-users that indicate a particular type of interaction with a given content item shared by the user. In this manner, less important notifications do not force out important notifications. Indeed, the user engagement system is able to provide the user with more relevant interaction notifications that correspond to multiple types of co-user engagements as well as interaction notifications corresponding to different content items shared by the user.

As explained above, the user engagement system improves efficiency relative to conventional systems. For instance, by reducing navigational requirements and user client device interactions, the user engagement system reduces processing requirements of the client device associated with the user. In addition, by presenting the most relevant messages, message requests, and notifications first, the user engagement system reduces the amount of data that is downloaded to a user's client device as well as the amount of data that is processed and loaded on the client device.

Further, client devices associated with users are often limited in storage space. Accordingly, the user engagement system reduces the amount of storage needed to store messages, message requests, and notifications that are inconsequential to the user. In this manner, the user engagement system can maximize available space on a user's client device by storing the data most relevant to the user.

Additionally, the user engagement system provides increased flexibility over otherwise rigid conventional systems. As discussed above, the user engagement system provides additional account types and sub-account types that better represent users. Further, the user engagement system provides additional options for communicating and engaging with co-users via the networking system or via other communication channels.

As described above, the user engagement system improves security and accuracy relative to conventional systems. Indeed, by providing highly granular growth insights, the user engagement system can more accurately account for a user's impact on co-users with respect to content items shared by the user. Further, the user engagement system can accurately track growth based on the actions of individual co-users rather than based on general co-user actions, as do conventional systems.

In addition, the user engagement system achieves increased accuracy by providing detailed growth insights with respect to individual shared content items and/or groupings of shared content items. In this manner, the user engagement system indicates the impact and influence of specific content items rather than a user's account as a whole. Furthermore, as described above, the user engagement system provides improved growth insights without requiring users to compromise their privacy or bypass security measures of the networking system by permitting third-party services access to their user accounts.

As illustrated by the foregoing discussion, the present disclosure utilizes a variety of terms to describe features and advantages of the user engagement system. Additional detail is now provided regarding these and other terms used herein. For example, as used herein, the term "digital content item" (or simply "content item") refers to one or more pieces of digital content or data. In particular, a content item can include digital content shared by a user of a networking system. Examples of content items generally include digital images, digital videos, and/or text. For instance, a content item includes an image as well as a caption of the image. In some embodiments, content items can include digital audio, electronic documents, streaming content, and/or other types of digital data. In various embodiments, a content item can refer to the content item itself or portions thereof (e.g., an image portion or a text comment portion associated with a content item).

In addition, the term "electronic message" (or simply "message") refers to a communication from a co-user of a networking system to a user of the networking system. In particular, a message can include a text or graphical communication from the co-user to the user within the networking system. An initial message between a co-user and user can trigger the user engagement system generating a message thread between the co-user and the user. Additional reply messages by the user or the co-user can be added to the message thread. Message threads can be stored in one of multiple message repositories, as described below.

In one or more embodiments, messages sent within a networking system can require prior approval by one or both users. In some instances, the approval is implicitly granted based on the user actively engaging with the co-user associated with a message. When prior approval is not yet granted, the co-user's message may trigger a message request within the networking system for the recipient user.

As used herein, the term "message request" refers to an invitation for the user to engage in active communication with the co-user. In particular, a message request can include a request by a co-user for the user to actively engage with a co-user via a message thread within the networking system. In many embodiments, a message request to the user includes a message sent by the co-user along with options for the user to accept or decline the message request. In various embodiments, the user engagement system hides the user's read receipt of the message request and corresponding message until the user accepts the message request.

As used herein, the term "message repository" refers to a collection of message threads within the networking system. In particular, a message repository can include a storage location accessible by a user to view, edit, and reply to messages maintained therein. As mentioned above, the user engagement system can maintain multiple message repositories that correspond to different groups of co-users. Examples of message repositories include, but are not limited to, primary, general, other, friends, close friends, family, clients, inbox, sponsors, prioritized, brand, fans, or business.

The terms "actively engaging" or "actively engaged," as used herein, refers to a user of the networking system intentionally engaging with a specific co-user or specific group of co-users via the networking system. In particular, an actively engaged user can include a user of the networking system approving two-way communication with one or more co-users of the networking system. As one example, the user can actively engage with a co-user by following the co-user via the networking system. As another example, the user can actively engage with a co-user by messaging the co-user or accepting a message request from the co-user within the networking system. In example embodiments, the user can actively engage with a co-user by tagging or referencing a co-user in a content item or a comment associated with a content item. In some embodiments, the user can actively engage with a co-user by commenting on a user's content item and/or replying to a co-user's comment for a content item.

Notably, a user can passively engage with a co-user without actively engaging with the co-user. Passive engagement of a user with co-users often involves the user performing an action with respect to many or all of their following co-users, while active engagement generally occurs on a more individual level. For example, when a user publicly shares or posts a content item, the user is passively engaging with co-users that can access and interact with the content item. Further, when a user provides contact information, the user is passively engaging co-users to contact the user by providing one or more methods to contact the user.

As mentioned above, co-users of the networking system can interact with content items shared by a user. As used herein, the term "user interaction with a content item," or similar terms, refer to activity by a user with respect to a content item. In particular, a user interaction with a content item can include a co-user of the networking system interacting with a content item shared by a user of the networking system. For example, a co-user accesses, browses, views, experiences, shares, or reacts (e.g., "like," comment, provide a positive reaction, or provide a negative reaction) to the user's content item. In many embodiments, users interact with a content item by providing user input to a client device that displays the content item.

Further, co-user interactions with content items can trigger interaction notifications to the user indicating how the co-user interacted with the content item. In various embodiments, as described below, the user engagement system can aggregate or combine the same type of interactions by co-users into an aggregated interaction notification. For example, upon a threshold number of co-users liking a given content item, the user engagement system indicates the total number of likes for the content item to the user in a single aggregated interaction notification. Additionally, the user engagement system can dynamically update the aggregated interaction notification as additional likes for the content item are detected.

Also, as mentioned above, the user engagement system can generate a prioritized list of message requests based on one or more metrics. The term "metric" as used herein, refers to an argument, factor, or other measurement unit. In particular, a metric can include a measurement unit utilized to compare and/or order message requests. Examples of metrics include the content item type associated with a given message request, the message content of the given message request, the timestamp of the given message request, whether the user has previously viewed the given message request, and whether the user has previously declined message requests from the same co-user.

In a number of embodiments, one or more metrics centers on the co-users associated with the message requests. For example, metrics can include the number of followers of the co-user associated with a given message request, the number of posts by the co-user, the verification status of the co-user, the activity history of the co-user, the account type of the co-user, previous interactions with content items shared by the user, and/or an affinity (e.g., social closeness) between the co-user and the user. Moreover, in various embodiments, the user engagement system applies different weights to multiple metrics to rank the message requests.

As used herein, the term "networking user account" (or simply "user account") refers to a collection of permissions, information, and data corresponding to a user of a networking system. In particular, a user account can include a collection of permissions (e.g., rights to access content), electronic communications, posts, shared content items, connections with other users (e.g., "friends" on a networking system) corresponding to a user of a networking system. In various embodiments, a single user can have multiple accounts with different permissions, purposes, and data (e.g., a first account for distributing content items regarding family updates to a first set of co-users and a second account for distributing content items regarding a pet to a second set of co-users).

Moreover, a user account can correspond to a particular account type. As used herein, the term "account type" refers to a defined set of configurable permissions, preferences, and settings of a user account. Indeed, different account types can utilize different user account permissions, preferences, and settings. Account types can be personal or professional, where professional accounts include amateur professionals, aspiring professionals, and traditional professions. Examples of professional account types include, but are not limited to, business accounts and creator accounts (e.g., a content creation account type). In addition, account types can include sub-account types. For example, professional creator account sub-types can include a public figure, a content publisher, an artist, a musician or band, a video creator, a writer, an internet media creator, a game creator, or another type of creative.

As used herein, the term "growth insight" refers to one or more analytics associated with a user's networking account with respect to co-users of the networking system. In particular, growth insights can include specific numbers, percentages, trends, graphics, and/or reports corresponding to co-user interactions with content items shared by the user. In various embodiments, growth insights can correspond to a given period of time and/or one or more particular content items shared by the user.

Additional detail will now be provided regarding the user engagement system in relation to illustrative figures portraying example embodiments and implementations of the user engagement system. For example, FIG. 1 illustrates an overview of providing various tools to a user of a networking system to improve user engagement with co-users of the networking system in accordance with one or more embodiments. In particular, FIG. 1 includes a series of acts 100 performed by the user engagement system to improve user engagement with co-users of a networking system.

As shown, the series of acts 100 includes an act 102 of the user engagement system providing a user with a creator account on a networking system. As described above, a networking system can provide various account types. In some embodiments, if the user has a personal account, the user engagement system can upgrade the user to a professional creator account. Similarly, if the user has a different professional account type, such as a business account, the user engagement system can enable the user to switch to the creator account. In other embodiments, the user engagement system can provide a new user with a creator account upon joining or subscribing to the networking system. Additional detail regarding establishing a creator account is provided in connection with FIGS. 3A-3H.

As mentioned above, the user engagement system provides tools, options, and features through a creator account that enhances and improves a user's ability to engage with co-users of the networking system as well as build and strengthen their co-user following. As shown in connection with the act 102, a creator account provides a user with the tools of intelligent filtering, notification aggregation, and growth insights.

As just mentioned, the user engagement system can provide intelligent filtering. To illustrate, the series of acts 100 includes an act 104 of the user engagement system receiving, prioritizing, and organizing message requests from co-users of the networking system. In various embodiments, the act 104 can include prioritizing message requests from co-users of the networking system with whom the user has not actively engaged on the networking system, presenting the most relevant message requests (e.g., top requests) to the user, and sorting accepted message requests into message repositories selected by the user.

In some embodiments, the user engagement system prioritizes the message requests by ranking the message requests according to one or more metrics. For example, for each message request, the user engagement system identifies co-users associated with the request and ranks the message requests based on the number of followers of corresponding co-users. Additional detail regarding the user engagement system ranking and prioritizing message requests is provided in connection with FIGS. 4-6C below.

As shown, the series of acts 100 includes an act 106 of generating aggregated interaction notifications for the user of the networking system. For example, as the user shares content items with co-users of the networking system, the co-users interact with the content items. For example, co-users comment, like, follow, or mention the user in response to the user's shared content item or another content item posted by the networking system. As the number of user interactions grows, especially within a short time period, the user engagement system can combine the interaction notifications into an aggregated interaction notifications, which the user engagement system presents as a single interaction notification to the user in an activity feed. Additional detail regarding the user engagement system generating aggregated interaction notifications is provided in connection with FIGS. 7-8B below.

FIG. 1 also shows the series of acts 100 including an act 108 of the user engagement system analyzing and providing growth insights for content items shared by the user via the networking system. As mentioned above, the user engagement system can determine accurate analytics associated with the user's creator account and provide growth insights to the user at various levels of granularity (e.g., month, week, day, hour). Similarly, the user engagement system can provide growth insights to a user at a per-post (or a posts-per-day) level in a single interface, which can indicate the individual impact of each shared content item. Additional detail regarding generating and providing growth insights is provided in connection with FIGS. 9-10E below.

Figure 2:
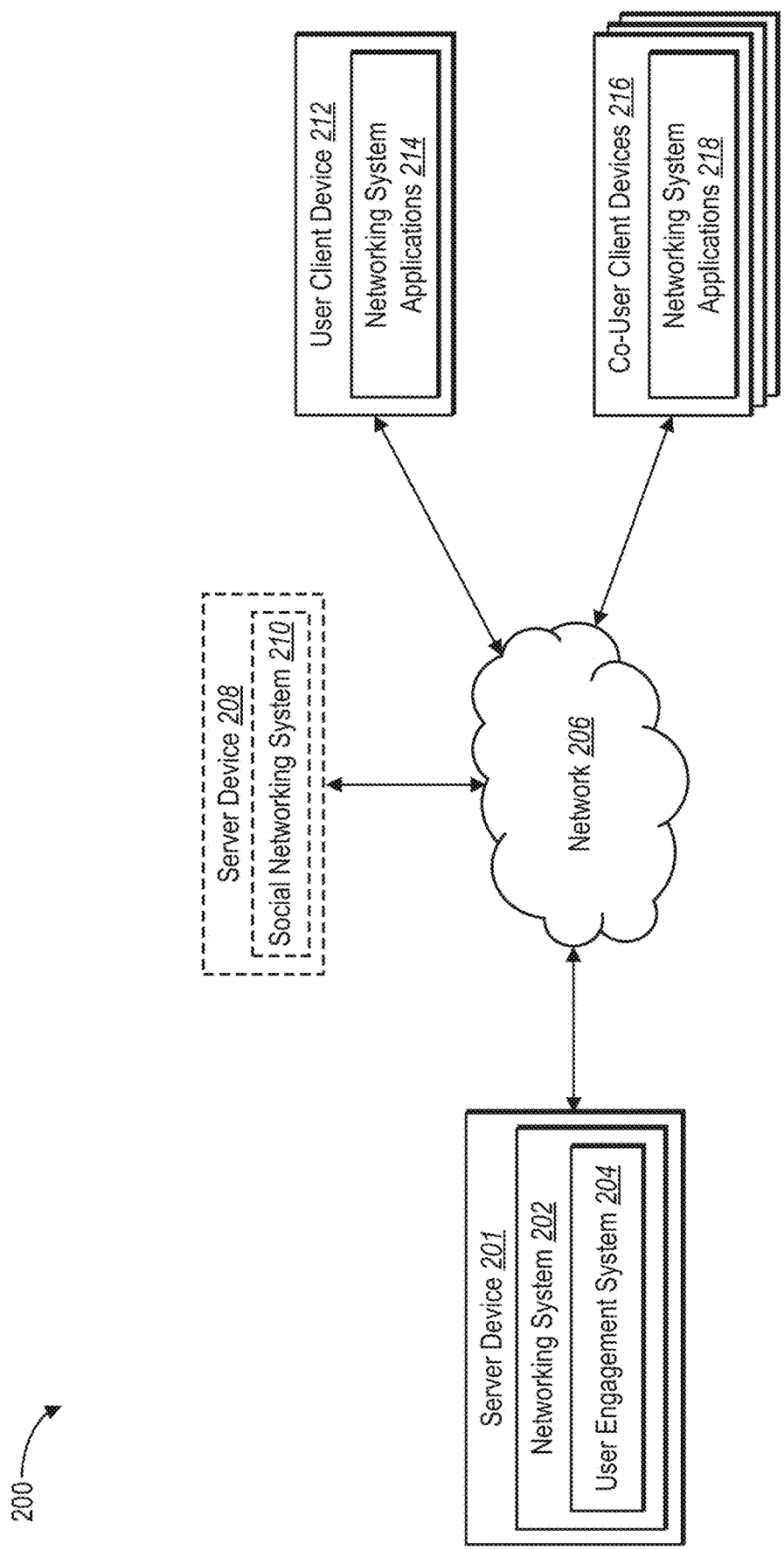
FIG. 2 illustrates a schematic diagram of an environment in which a networking system having a user engagement system operates in accordance with one or more embodiments.

FIG. 2 illustrates a schematic diagram of one embodiment of an example environment 200 in which a user engagement system 204 can operate. As shown, the environment 200 includes a server device 201 connected to multiple client devices (i.e., a user client device 212 and co-user client devices 216) via a network 206. In some embodiments, the environment 200 includes an optional server device 208. Examples of computing device, such as server devices and client devices as well as of networks are described in more detail below with respect to FIG. 13. Each of the server devices 201, 208 shown in FIG. 2 can comprise a collection of servers or a cloud computing system as described below.

As shown, the server device 201 includes a networking system 202 having a user engagement system 204. In addition, the user client device 212 includes a networking system application 214. Similarly, the co-user client devices 216 include corresponding networking system applications 218. Further, the optional server device 208 includes a social networking system 210. Each of these elements is described below.

As shown, the environment 200 may include the server device 201. In one or more embodiments, the server device 201 may generate, store, receive, and transmit a variety of types of data, including networking data and content items shared by users of the networking system 202. For example, the server device 201 may receive data from a client device, such as the user client device 212, and send the data to another client device, such as one of the co-user client devices 216. The server device 201 can also transmit messages and message requests between one or more users of the environment 200. In one example embodiment, the server device 201 is a data server. The server device 201 can also comprise a communication server or a web-hosting server. Additional detail regarding the server device 201 is provided below with respect to FIG. 12.

As shown, the server device 201 includes the networking system 202 and the user engagement system 204. Indeed, in one or more embodiments, the networking system 202 can implement all or a portion of the networking system 202 and/or the user engagement system. The networking system 202 can connect users to each other and enable users to share content items with each other. For example, the networking system 202 facilitates users to send content items to co-users directly, share content items with specific groups of co-users, and/or share content items to co-users of the networking system 202 generally (e.g., public posts). Further, the networking system 202 can include a social networking system, an electronic messaging system, or another type of networking system that enables users to communicate with each other. Additional detail regarding the networking system 202 is provided below in connection with FIGS. 14 and 15.

The user engagement system 204, as mentioned above, enables users to better engage with co-users of the networking system 202. In particular, the user engagement system 204 intelligently prioritizes and streamlines communications and notifications associated with co-users in a manner that enables a user to maximize their engagement efforts with their co-users. In addition to the description of the user engagement system 204 provided above, further detail is provided below in subsequent figures with respect to example embodiments of the user engagement system 204.

The networking system 202 and/or the user engagement system 204 can comprise one or more applications running on the server device 201 or a portion can be downloaded from the server device 201. For example, the user engagement system 204 can include a web hosting application that allows the client devices (i.e., user client device 212 and co-user client devices 216) to interact with content hosted at the server device 201. To illustrate, in one or more embodiments of the environment 200, one or more co-user client devices 216 can run a web application (e.g., a web browser) to allow users to access, view, and/or interact with a webpage or website hosted at the server device 201.

As mentioned above, the client devices can include networking system applications. For example, the user client device 212 includes the networking system application 214 and the co-user client devices 216 include the networking system applications 218. In various embodiments, the networking system application 214 and the networking system applications 218 are the same networking system application. For example, the networking system application is a software application of the networking system 202 that enables the networking system 202 to provide and display content items on the client devices. Additionally, the networking system applications can receive user input at a client device and provide information corresponding to the user input to the networking system 202.

As shown, the environment 200 includes the social networking system 210 implemented on the optional server device 208. When the social networking system 210 is included in the environment 200, users of the social networking system 210 may be able to use the features and functionalities of the user engagement system 204 and/or networking system 202. For example, in some embodiments, the user engagement system 204 is part of, or directly connected to, the social networking system 210. In alternative embodiments, the user engagement system 204 is separate from the social networking system 210, but users of the social networking system 210 can access content items via the social networking system 210. Additional detail regarding the social networking system 210 is provided below in connection with FIGS. 14 and 15.

Although FIG. 2 illustrates a particular arrangement of the server device 201, the optional server device 208, the user client device 212, the co-user client devices 216, and the network 206, various additional arrangements are possible. For example, the user client device 212 may directly communicate with the server device 201, bypassing the network 206. Alternatively, the server device 201 and the optional server device 208 may directly communicate with each other.

Similarly, although the environment 200 of FIG. 2 is depicted as having various components, the environment 200 may have additional or alternative components. For example, the networking system 202 and/or the user engagement system can be implemented across multiple server devices. As another example, both the networking system 202 and the social networking system 210 can be implemented on a single computing device (e.g., a server device).

Turning now to FIGS. 3A-3H, additional detail is provided regarding providing a user with a creator account. In particular, FIGS. 3A-3H illustrate a client device 300 with a dynamic user interface 302 for generating a creator account within the networking system in accordance with one or more embodiments. As mentioned, FIGS. 3A-3H include the client device 300 having a dynamic user interface 302 (i.e., shown as user interfaces 302a-302g).

In a number of embodiments, the client device 300 represents a user client device (e.g., user client device 212) and the user interfaces 302a-302g can show renderings from an application (e.g., the networking system application 214) on the client device 300, where the networking system application provides content (e.g., content items), options, and networking system features received from the networking system (e.g., the networking system 202).

Figure 3B:
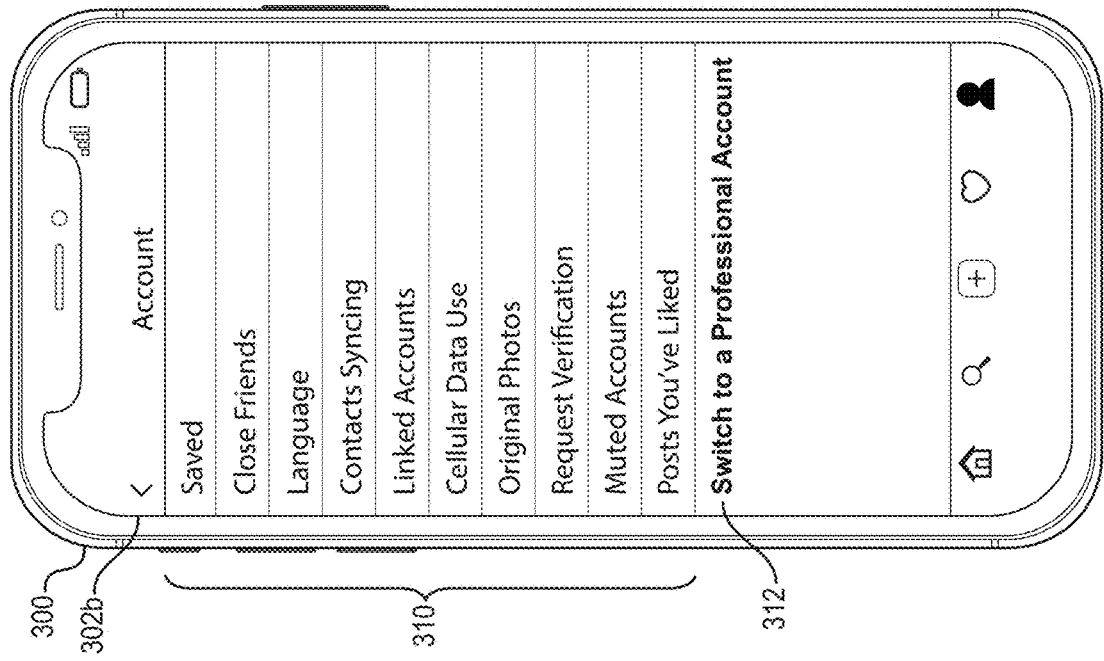
FIGS. 3A-3F illustrate a computing device with a user interface for generating a creator account within the networking system in accordance with one or more embodiments.
Figure 3A:
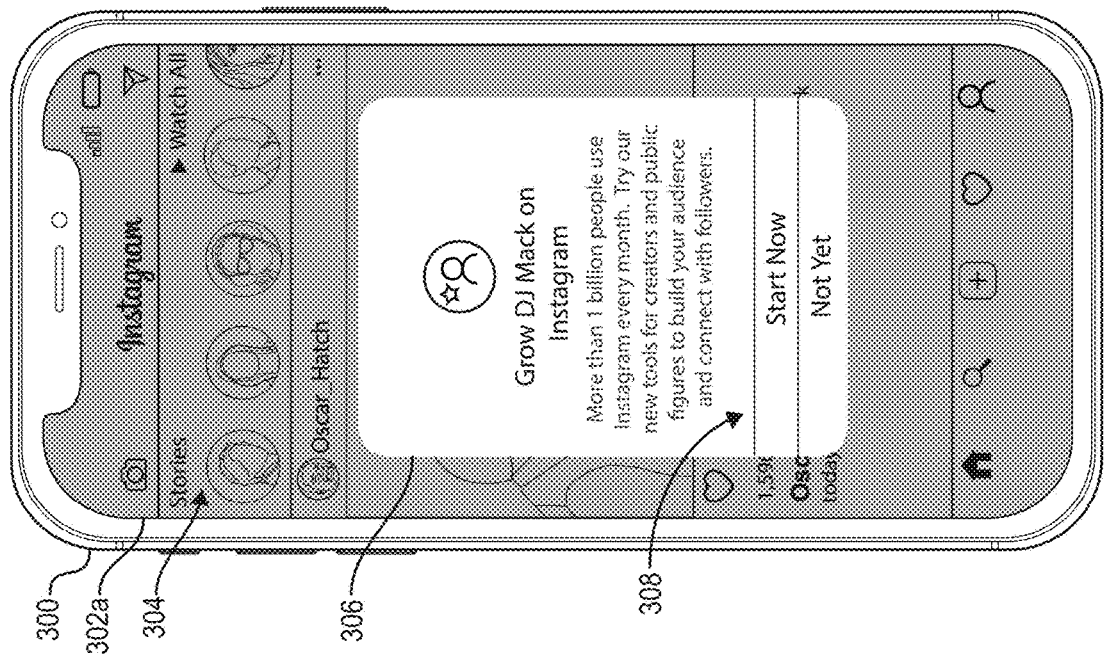

As shown in FIG. 3A, the networking system application 214 provides a user interface 302a that display a user's networking system account of the networking system. In particular, the user interface 302a shows a partially covered background portion 304 of content items shared by co-users of the networking system. In addition, the user interface 302a also includes a foreground element 306 that appears over the background portion 304.

As illustrated in FIG. 3A, the networking system application 214 can provide a foreground element 306 that includes a message to the user (i.e., D J Mack) on switching the user's account type to a creator account. In particular, the message indicates how the creator account provides new tools that facilitate better co-user engagement and audience growth. In connection with the message, the foreground element 306 includes options 308 to proceed with the switch (i.e., "Start Now") or delay changing the user's account type (i.e., "Not Yet").

In one or more embodiments, the networking system application 214 determines to show the user the foreground element 306 when a predetermined threshold is satisfied. For example, the networking system application 214 can provide the foreground element 306 upon the user reaching threshold a number of followers, posts, comments, messages, and/or interaction notifications. In another example, the networking system application 214 provides the foreground element 306 upon the user having a personal account for a threshold period of time (e.g., a week, month, year). In still another example, the networking system application 214 provides the foreground element 306 or a similar message and corresponding options 308 when a user creates an account on the networking system.

Upon selection the option to proceed with the switch (i.e., "Start Now"), as shown in FIG. 3B, the networking system application 214 provides the user interface 302b on the client device 300 to show a list of account options 310 including an option 312 to switch to a professional account. Indeed, in one or more embodiments, the list of account options 310 is normally located multiple levels deep within a user's account settings of the networking system application. However, upon selecting the option to proceed presented in the foreground element 306 shown in FIG. 3A, the networking system application 214 automatically navigates the user directly to the list of account options 310, thus eliminating surplus user interactions on the client device 300.

Figure 3D:
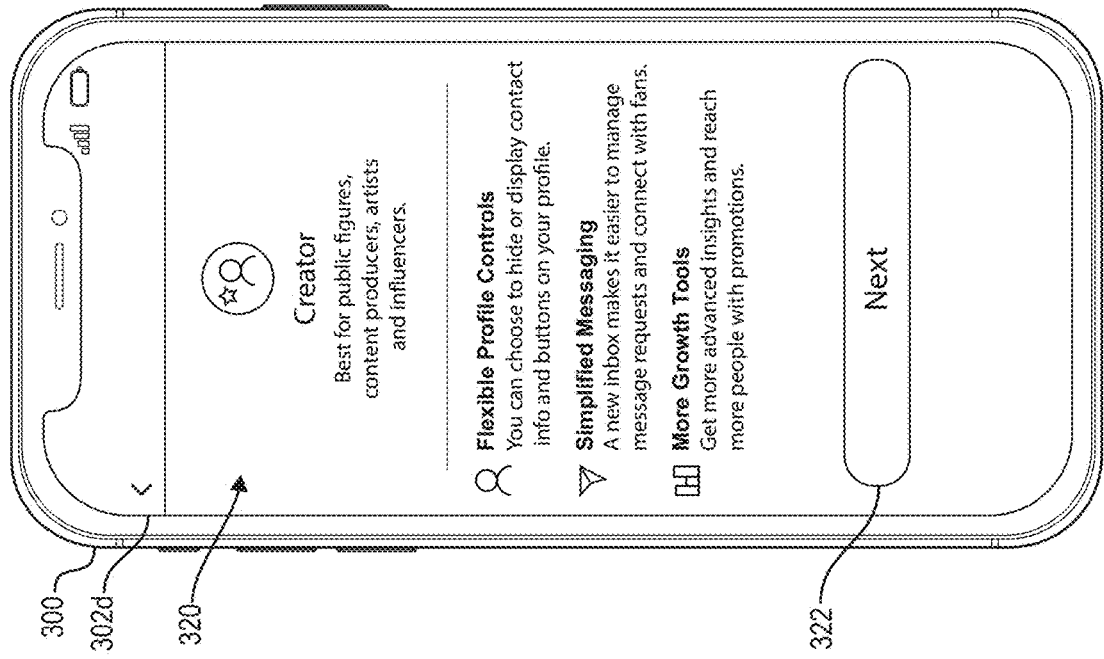
Figure 3C:
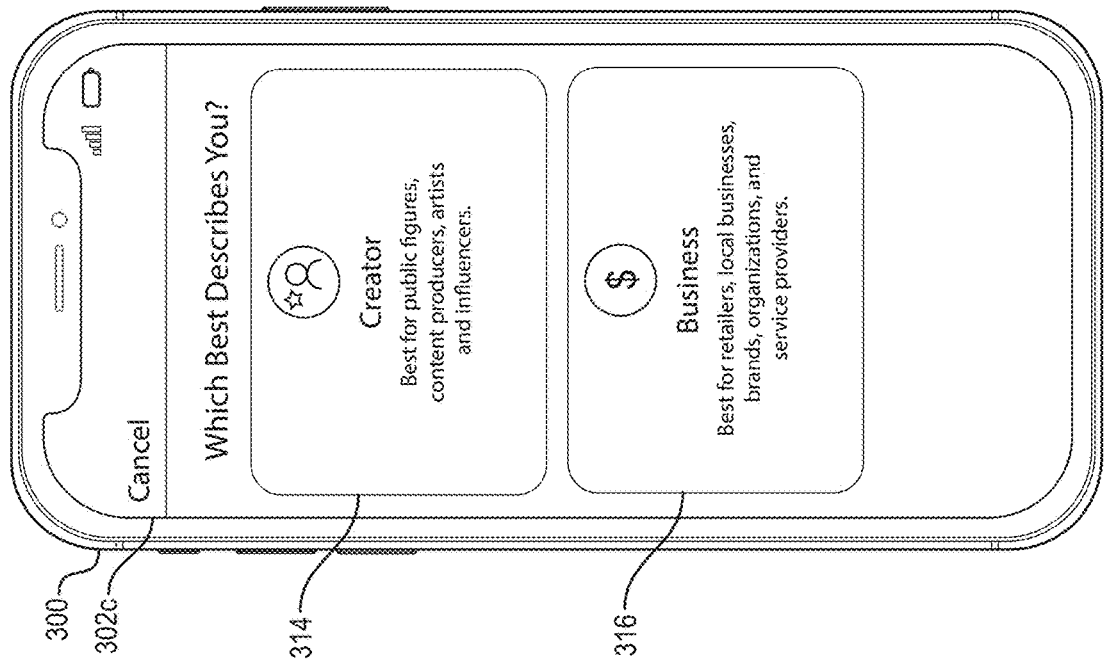

As shown in FIG. 3C, the networking system application 214 updates the user interface 302c to display selectable elements. In particular, the networking system application 214 provides the updated user interface 302c including a first selectable element 314 associated with a creator account. Indeed, upon detecting the user selecting the first selectable element 314, the user engagement system 204 proceeds with switching the user's account type to a creator account. Alternatively, the user engagement system 204 enables the user to select the second selectable element 316 to proceed with switching their account type to a business account.

The networking system application 214, as shown in FIG. 3D, can provide the user interface 302d to confirm the user's selection of switching their account type to a creator account. Indeed, upon detecting a user selecting the first selectable element 314 in the user interface 302c of FIG. 3C, the networking system application 214 updates the user interface 302d to show a creator account confirmation message 320 providing further detail regarding the benefits, tools, and features of having a creator account. As shown, the confirmation message 320 indicates that a creator account is suited for users of the networking system that share a large number of content items and/or has a growing following of co-users.

A user can select the "Next" element 322 within the updated user interface 302d to proceed in using a creator account type. The updated user interface 302d shown in FIG. 3D can include additional elements, such as an element to cancel the user's action. In addition, the updated user interface 302d can include an option to create a creator account as a new user account.

Figure 3F:
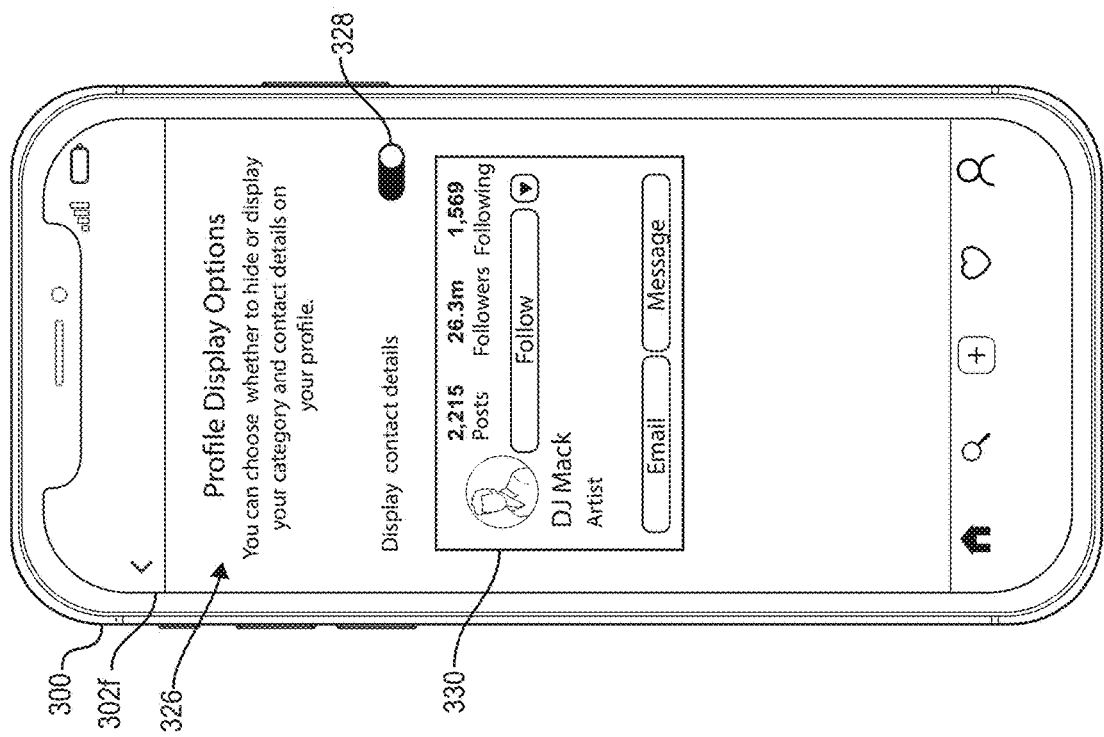
Figure 3E:
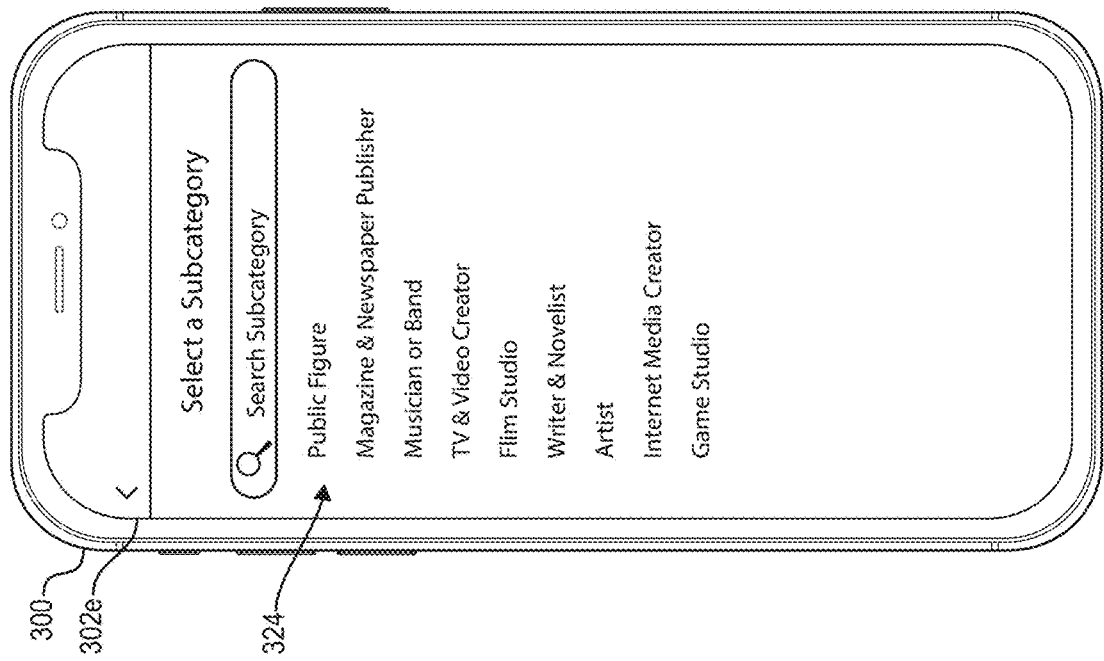

The networking system application 214, as shown by FIG. 3E, can provide the user interface 302e to include subcategories of a creator account within the networking system. As mentioned above, the user engagement system 204 can enable a user to specify a sub-account type 324 that best aligns to the user's circumstances. By selecting a sub-account type 324, the user engagement system 204 enables users to flexibly and accurately represent themselves to co-users of the networking system rather than mischaracterize themselves, which often confuses their co-users and prevents many co-users from following the user.

The networking system application 214 provides, as shown by FIG. 3F, a user interface 302f to present profile display options 326 on the client device 300. As shown, the networking system application 214 can profile display options 326 that include a display contacts element 328. In various embodiments, the networking system application 214 provides the display contacts element 328 to enable the user to choose when co-users are shown the user's contact information on the user's profile. For example, when the display contacts element 328 is selected or toggle on, the networking system application 214 includes options to email or message the user within the user's profile, as illustrated in the user profile preview 330. Equally, when the display contacts element 328 is deselected or toggle off, the networking system application 214 updates the user profile preview to remove the email and/or message options.

In one or more embodiments, the networking system application 214 modifies the user interface 302f to include additional and/or alternative options for a user to display or hide their contact information from co-users. Indeed, the networking system application 214 can provide numerous options for a user to flexibly control how and when to engage with co-users of the networking system. To illustrate, the user engagement system 204 can include separate options to show or hide contacting the user via email or message. Further, the user engagement system 204 can enable the user to set a schedule of when to include or exclude certain contact information from their profile.

In some embodiments, the user engagement system 204 enables a user to specify different contact settings for different co-user groups. For example, the user engagement system 204 can provide one set of contact parameters for co-users with whom the user has previously engaged. Additionally, the user engagement system 204 can provide a second set of contact parameters for co-users with whom the user has not previously actively engaged. Further, the user engagement system 204 can provide distinct contact parameters for family, close friends, business partners, sponsors, clients, fans, or other user groups.

In additional embodiments, the user engagement system 204 can enable a user to show or hide their account type or sub-category account type. For example, the user engagement system 204 flexibly enables a user to benefit from the tools and features of a creator account while having the user's account appear as a personal account. Thus, when a user switches from a personal account to a professional creator account, the user engagement system 204 enables the user to maintain the same appearance of their account to their followers and other co-users of the networking system.

As shown in FIGS. 3A-3F, the user engagement system 204 can provide (via the networking system application) various user interfaces to a user to transition the user to a creator account. While a number of user interfaces are shown, the user engagement system 204 can provide more or fewer user interfaces. For instance, the user engagement system 204 adds a user interface that enables the user to link their user account to a user account of a social networking system. In another instance, the user engagement system 204 skips the user interface 302b shown in FIG. 3B, the user interface 302c shown in FIG. 3C, the user interface 302d shown in FIG. 3D, and/or the user interface 302e shown in FIG. 3E. For example, upon selecting the option to proceed in FIG. 3A, the user engagement system 204 updates the user interface to the user interface 302e shown in FIG. 3E or the user interface 302f shown in FIG. 3F.

As mentioned above, the user engagement system 204 provides a number of benefits, tools, and features in connection with a creator account that improve a user's ability to engage with co-users and/or build their following within the networking system. In some embodiments, the user engagement system 204 provides the benefits, tools, and features for all or accounts (e.g., including personal accounts). FIGS. 4-10E provide additional description regarding these benefits, tools, and features.

Turning now to FIGS. 4-6B, additional detail is provided regarding the user engagement system 204 prioritizing message requests received by a user of the networking system. For instance, FIG. 4 illustrates a sequence diagram of prioritizing engagement message requests in accordance with one or more embodiments. In particular, FIG. 4 illustrates a series of acts 400 of the user engagement system 204 prioritizing, for a user, engagement message requests from co-users with whom the user has not previously actively engaged via the networking system.

As shown, FIG. 4 includes the user engagement system 204, the user client device 212, and the co-user client devices 216. In many embodiments, these computing devices relate to corresponding computing devices described above in connection with FIG. 2. For example, the user engagement system 204 can be implemented on a networking system (e.g., the networking system 202). Additionally, in some embodiments, the user engagement system 204 performs one or more acts via a networking system application on the user client device 212 or the co-user client devices 216. Further, while the user engagement system 204 is shown as performing the series of acts 400, in some embodiments, the networking system performs part or all of the series of acts 400. Furthermore, the user engagement system 204 can comprise a non-transitory storage medium comprising instructions that when executed by a server(s) or processor causes the server or another computing device to perform the acts described below. To aid in description, FIGS. 4, 7, and 9 describe the user engagement system 204 as performing acts as shorthand.

In addition, as shown, the series of acts 400 includes an act 402 of the user engagement system 204 receiving message requests for a user from co-users of the networking system. For example, co-users of the networking system send messages to the user via the networking system. If the user has not actively engaged with a co-user that has sent a message to the user (e.g., the user is not a follower of the co-user and has not previously messaged the user), the user engagement system 204 packages the message with a message request.

The series of acts 400 also includes an act 404 of the user engagement system 204 ranking the message requests based on one or more metrics. In some embodiments, the user engagement system 204 determines to rank the message requests of a user when a predetermined threshold is satisfied. For example, the user engagement system 204 determines to rank the message requests when the user has at least a first total number (e.g., 10, 50, 100) of pending message requests, or if the user has received at least a second number (e.g., 25, 40, 75, 100) of message request within a set time period (e.g., six hours, a day, a week, a month). In another example, the user engagement system 204 determines to rank the message requests when the user has at least a predetermined number of followers (e.g., 100, 250, 1,000, 2,000, 5,000). Alternatively, the user engagement system 204 can rank message requests for all user having a creator account type irrespective of predetermined thresholds.

As mentioned above, the act 404 includes ranking the message requests based on one or more metrics. In one or more embodiments, the user engagement system 204 utilizes metrics based on the content item type of associated with a message requests (e.g., an image, story, live stream, or video). For example, in various embodiments, when the networking system shares a user's content item, the user engagement system 204 provides a messaging option in connection with the shared content item (which the user can choose to show or hide in their user settings, as discussed above). The user engagement system 204 can label these message request to indicate the corresponding content item/content item type. Based on this label, the user engagement system 204 can rank the message requests. For instance, the user engagement system 204 ranks ephemeral video content items (e.g., stories that disappear after a set time period) above image content items that are more permanent, or vice versa.

In some embodiments, the user engagement system 204 ranks the message requests based on the message content of the message requests. As mentioned above, the user engagement system 204 generates a message request when a co-user with whom the user has not actively engaged with sends a direct message to the user. Accordingly, in various embodiments, the user engagement system 204 ranks the message requests based on the message content of the message requests. For example, the user engagement system 204 increases the rank of a message request upon identifying the user (or other co-users closely associated with the user) being mentioned in the message.

In another example, the user engagement system 204 increases the rank of a message request upon identifying particular tags (e.g., hashtags) in the message associated with the user. In an additional example, the user engagement system 204 parses the message and/or utilizes natural language processing to detect keywords in the message associated with the user. Upon identifying keywords associated with a user, the user engagement system 204 increases the rank of the corresponding message request. In contrast, the user engagement system 204 can decrease the rank of a message request (or remove the message request) upon detecting spam or solicitations in the corresponding message.

As mentioned above, the user engagement system 204 can detect that the content of the message associated with the message requests is associated with the user. For example, the user engagement system 204 detects that message content (e.g., tags, keywords, or phrases) is included in content items shared by the user, used in a comment or message authored by the user, or associated with the user's profiled on the networking system or another social networking system. For example, the user engagement system 204 maintains a listing of content associated with the user and compares the contents of messages against to the listing to determine a level of relatedness, which the user engagement system 204 then users to rank the corresponding message requests.

In some embodiments, the user engagement system 204 ranks message requests based on the timestamps of the message requests. For example, the user engagement system 204 ranks recent requests above older requests. In other examples, the user engagement system 204 ranks requests based on time periods. To illustrate, the user engagement system 204 can rank message requests in a first time period (e.g., 0-1 hours) with a first value, requests in a second time period (e.g., 1-5 hours) with a second value, requests in a third time period (e.g., 6-24 hours) with a third value, and requests in a fourth time period (e.g., 24+ hours) with a fourth value, where the values decrease over time (or vice versa).

In one or more embodiments, the user engagement system 204 ranks message requests based on whether the user has previously viewed the request. For example, the user engagement system 204 decreases the rank of a message request each time the user views the request and/or opens the request without responding to the request (or vice versa). In some embodiments, the user engagement system 204 waits a predetermined amount of time (e.g., 30 seconds) before counting a message request that is visible within a message request feed as being viewed by a user.

Similarly, in some embodiments, the user engagement system 204 ranks message requests based on whether a given co-user has sent previous requests. For example, for the first x times the given co-user sends a message request, the user engagement system 204 increases the rank of the subsequent message request (or vice versa). Then, upon the number of message requests by the given co-user reaching a request count threshold, the user engagement system 204 begins decreasing the rank of the subsequent message request by the given co-user (or vice versa).

In example embodiments, the user engagement system 204 ranks message requests based on whether the user has previously declined a message request from a co-user. For example, the user engagement system 204 assigns a lower or lowest rank to a co-user for whom the user has declined one or more message requests. In some embodiments, the user engagement system 204 blocks message requests from users for whom the user has declined one or more message requests.

Additionally, the user engagement system 204 can rank message requests based on metrics involving characteristics of co-users associated with the message requests. For instance, in one or more embodiments, the user engagement system 204 ranks message requests based on the number of followers of a co-user associated with a message request. To illustrate, the user engagement system 204 ranks a first message request of a first co-user with a larger number of followers above a second message request of a second co-user with a smaller number of followers (or vice versa).

In some embodiments, the user engagement system 204 ranks message requests based on a range of followers or different follower thresholds. For example, the user engagement system 204 ranks message requests associated with co-users having over 500 followers with a first value, message requests associated with co-users having over 1,000 followers with a second value, message requests associated with co-users having over 5,000 followers with a third value, etc., where the values increase (or vice versa).

In various embodiments, the user engagement system 204 ranks message requests based on the number of posts by the co-user associated with a message request. For example, the user engagement system 204 can rank message requests associated with co-users who post more frequently, who have more posts within a set time period (e.g., the last week or month), and/or who have more total posts with a higher rank than other co-users with fewer corresponding posts.

In addition, the user engagement system 204 can rank message requests based on verification statuses of co-users associated with the message requests. For example, in one or more embodiments, the user engagement system 204 ranks message requests associated with co-users that are verified by the networking system above co-users who are unverified by the networking system. In this manner, the user engagement system 204 indicates that non-anonymous and/or confirmed co-users are of more interest to the user than unknown users.

Further, in some embodiments, the user engagement system 204 ranks message requests based on activity history of co-users associated with the message requests. For instance, the user engagement system 204 can evaluate the age of a co-user account on the networking system, the frequency of the co-user accessing the networking system, the number interactions (i.e., reactions) of the co-user with content items on the networking system, the frequency of those interactions (e.g., how often the co-user likes, comments, or tags content items), or the response rate of the co-user with respect to other co-users.

In various embodiments, the user engagement system 204 ranks message requests based on the account type of co-users associated with the message requests. For instance, the user engagement system 204 can rank message requests from co-users associated with creator accounts higher than message requests from co-users associated with personal accounts. In another instance, the user engagement system 204 can rank message requests from co-users associated with creator accounts higher than message requests from co-users associated with business accounts (or vice versa).

Furthermore, in one or more embodiments, for co-users having creator accounts, the user engagement system 204 can further rank message requests based on sub-account types. For example, the user engagement system 204 ranks message requests of co-users having creator accounts with the same sub-account type or similar sub-account types above co-users having creator accounts with different sub-account types. Indeed, the user engagement system 204 can maintain a nexus table that indicate similarity strengths between sub-account types, which the user engagement system 204 utilizes to rank corresponding message requests.

In some embodiments, the user engagement system 204 ranks message requests based on an affinity (e.g., a social affinity score or network closeness) of co-users associated with the message requests and the user. For example, the user engagement system 204 determines an affinity score between the user and a co-user of a message request, which the user engagement system 204 utilizes to rank the message request, where a higher affinity is ranked above a lower affinity. The affinity determination can correspond to an affinity via the networking system or via another social networking system.

In additional embodiments, the user engagement system 204 ranks message requests based on secondary engagement connections. For example, the user engagement system 204 can rank a message request from a co-user based on the number of co-users with whom the user has actively engaged who have also actively engaged the requesting co-user. To illustrate, the user engagement system 204 determines that while the user has not actively engaged with the co-user of a message request, the co-user is followed by a number of co-users that the user follows. Accordingly, the co-user is likely of more relevance to the user than other co-users associated with message requests. Thus, the user engagement system 204 increases the rank of the message request associated with co-user.

In a number of embodiments, the user engagement system 204 ranks the message requests based on previous co-user interactions with content items shared by the user. For example, for a message request by a given co-user, the user engagement system 204 identifies the number of times the given co-user has commented on or liked a content item shared by the user. In another example, the user engagement system 204 identifies how often a comment left by the co-user within a comment section of a content item shared by the user was liked or replied to by other co-users. Based on these identified elements, the user engagement system 204 can rank the message request associated with the given co-user (e.g., increase the rank based on a co-user attracting a lot of reply comments or based on the co-user liking every content item shared by the user).

Based on the above description, the user engagement system 204 can utilize a number of message request metrics to rank message requests. Indeed, the user engagement system 204 can utilize one of the above described metrics or a combination of multiple metrics. When utilizing multiple metrics, in various embodiments, the user engagement system 204 applies different weights to different metrics to form an overall ranking for each message request. For example, the user engagement system 204 applies a 50% weight to ranking message requests based on the number of followers, a 30% weight to ranking message requests based on message content, and a 20% weight to ranking message requests based on timestamps.

Returning to FIG. 4, upon ranking the message requests, the user engagement system 204 can arrange or order the message requests according to rank. To illustrate, the series of acts 400 includes an act 406 of the user engagement system 204 generating a prioritized list of message requests. In particular, in one or more embodiments, the user engagement system 204 can generate the prioritized list of message request based on the rankings (e.g., a ranked score) determined for each of the message requests provided to the user. In some embodiments, the user engagement system 204 generates multiple prioritized lists of the message request based on different ranked metrics.

As shown, the series of acts 400 includes an act 408 of the networking system application 214 detecting a request from the user to view message requests on the user client device 212. For example, the networking system application 214 shows the user on the user client device 212 that he or she has a number of pending message requests. In response, the user selects the option to view the pending message requests. Based on the user's selection, the networking system application 214 detects the user's request to view the message requests on the user client device 212. The networking system application 214 can then provide a notification to the user engagement system 204 that the user has requested to view message requests.

As also shown, the series of acts 400 includes an act 410 of the user engagement system 204 providing the message requests to the user via the user client device 212 arranged based on the prioritized list. In particular, based the detecting the user's request to view pending message requests, the user engagement system 204 provides the message requests along with the prioritized list that indicates the order (i.e., priority) that the message requests should be displayed to the user.

Further, the series of acts 400 includes an act 412 of the user engagement system 204 enabling the user to engage with co-users associated with the prioritized message requests. In particular, the user engagement system 204 provides the user with message requests prioritized based on predicted user relevance, indicating the most relevant message requests first. The networking system application 214 in turn can in turn provide the message requests arranged based on the prioritized list in a graphical user interface. Using the prioritized message requests, the user can determine which co-users with whom to engage (e.g., accept their message request, send a response message, and/or follow) where the engagement is facilitated by the user engagement system 204.

FIGS. 5A-6C provides a flow of user interfaces on a client device showing the user requesting to view message requests, viewing prioritized message requests, and engaging with a co-user based on a message request. In particular, FIGS. 5A-5E illustrate a client device 300 with a dynamic user interface 502 portraying prioritized engagement message requests in accordance with one or more embodiments.

As mentioned, FIGS. 5A-5E include the client device 300 having a dynamic user interface (i.e., shown as user interfaces 502a-502e). In a number of embodiments, the client device 300 represents the client device 300 introduced in FIG. 3A and can represent the user client device 212 described in connection with FIG. 2. In addition, the user interfaces 502a-502e can show renderings from networking system application 214 mentioned above.

As shown in FIG. 5A, the networking system application 214 provides the user interface 502 displaying a user's networking system account of the networking system. In particular, the networking system application 214 provides the user interface 502a showing a content item feed 504 that includes multiple types of content items. For example, the content item feed 504 includes story content items 506 (i.e., "Stories") as well as an image content item 508. As shown, the image content item 508 includes an image, comments, and content item interaction elements (e.g., like, comment, message).

In addition, the networking system application 214 provides the user interface 502a with a message navigation element 507 to access the user's direct messages. Further, as shown in the illustrated embodiment, the user interface 502a also includes a message popup notification element 509 that indicates that new tools are now associated with direct messages. For instance, the networking system application 214 provides the message popup notification element 509 based on the user switching to a creator account and having the new tools enabled on the user's account.

The networking system application 214 can provide the user interface 502b to show the user's direct messages in a direct messages view 510 on the client device 300, as shown by FIG. 5B. For example, the networking system application 214 displays the direct messages view 510 in the user interface 502b in response to the user selecting the message navigation element 507 from FIG. 5A.

As shown in FIG. 5B, the networking system application 214 provides the direct messages view 510 and includes message repositories (e.g., message folders) including a primary message repository 512 and a general message repository 514. While two message repositories are shown, the user engagement system 204 can maintain any number of message repositories. For example, the user engagement system 204 can include message repositories corresponding to family, close friends, business partners, sponsors, clients, fans, or other user groups. Further, the user engagement system 204 can enable users to add, remove, or rename, or otherwise modify message repositories.

As also shown, the primary message repository 512 is selected. Accordingly, the networking system application 214 displays direct messages 516 maintained in the primary message repository 512. The user engagement system 204 enables the user to select individual messages (e.g., message threads) to view one or more messages between the user and the selected co-user.

In addition, the networking system application 214 provides additional options as the user interacts with an individual message. To illustrate, in response to the user interacting with an individual message as shown (e.g., sliding a message to the left), the networking system application 214 provides a message menu element 518 that enables the user to delete the message, move the message to the general message repository 514, or reveal additional message menu options. For instance, upon detecting the user selecting the message menu to move the message to the general message repository 514, the networking system application 214 removes the given message from the primary message repository 512 and adds the message to the general message repository 514 (shown in FIG. 6C).

As mentioned above, with the primary message repository 512 selected, the networking system application 214 displays direct messages 516 maintained in the primary message repository 512. Notably, each of the messages 516 is associated with a co-user with whom the user has actively engaged via the networking system. In addition, upon detecting the user selecting the general message repository 514, the networking system application 214 can update the user interface 502*b* to show direct messages maintained in the general message repository 514, as shown in connection with FIG. 6C, which is described below.

In addition, the direct messages view 510 in FIG. 5B, the networking system application 214 can also include a message request indicator 5200. For instance, the message request indicator 520 indicates that over ninety-nine (i.e., 99+) message requests are waiting for user approval. Upon detecting the user selecting the message request indicator 518, the networking system application 214 can update the user interface 502*b* to show a message request view, as described below.

Figure 5D:
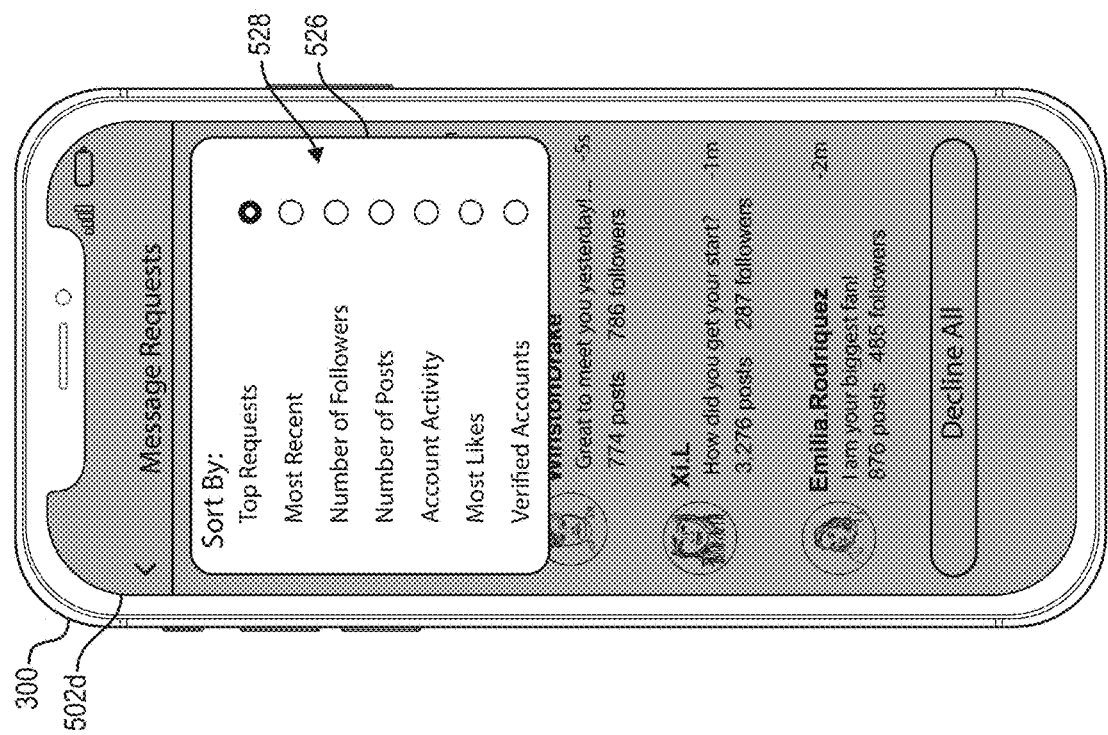
Figure 5C:
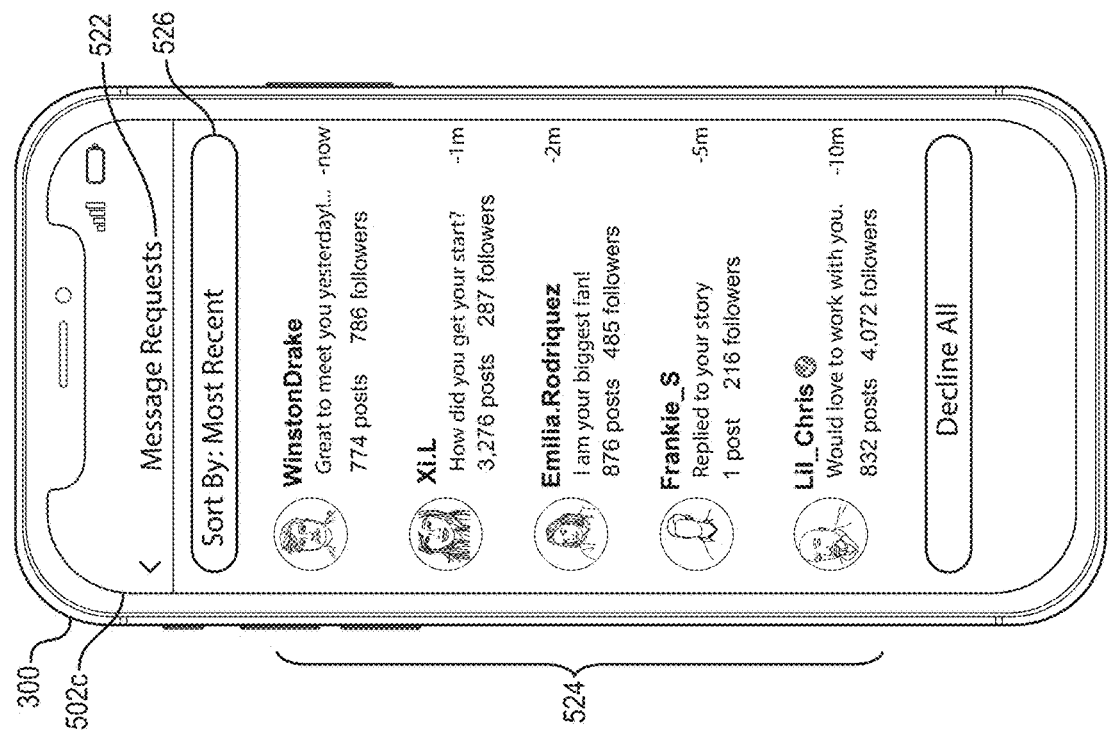

For example, FIG. 5C illustrates the networking system application 214 providing a user interface 502*c* showing a message request view 522. As shown, the message request view 522 includes message requests 524 and a sort selection element 526. Notably, each of the message requests 524 is associated with a co-user with whom the user has not actively engaged via the networking system. In addition, each of the message requests 524 includes the username of the co-user associated with the message request, all or a part of the message contents associated with the message request, and characteristics (e.g., number of posts and followers) of the co-user associated with the message request. Further, while the user interface 502*c* shows a limited number of (i.e., 5) message requests, the user can provide user input (e.g., scroll down) to view additional message requests.

As shown, the networking system application 214 can short the message request view 522 to show most recent message requests first as indicated by a sort selection element 526. In various embodiments, the user can change the sort order via the sort selection element 526. To illustrate, the networking system application 214 can provide a user interface 502*d* (see FIG. 5D) that includes an expanded sort selection element 526, which expands in response to the user selecting the sort selection element 526 in FIG. 5C. As shown, the expanded sort selection element 526 includes multiple sort options 528 available to the user.

In various embodiments, the networking system application 214 provides sort options 528 that correspond to different metric rankings and/or combinations of metric rankings for the message requests, which are described above in connection with FIG. 4. Indeed, the user engagement system 204 can generate multiple prioritized lists of message requests that correspond to the different sort options 528 presented to a user. In this manner, in response to a user selection of one of the sort options 528, the networking system application 214 can access (e.g., retrieve from memory or download from the user engagement system 204) the corresponding prioritized list and order the message requests in accordance with the corresponding prioritized list.

As shown in FIG. 5D, the user selects the sort option of "Top Requests." In response to detecting the user sort option selection, the networking system application 214 updates the message requests view 522 to include a prioritized list of message requests corresponding to the message requests that are most likely to be viewed by the user. Alternatively, in response to detecting a user selection of another sort option, the networking system application 214 updates the message requests view 522 to include a prioritized list of message requests corresponding to the selected sort order.

Figure 5E:
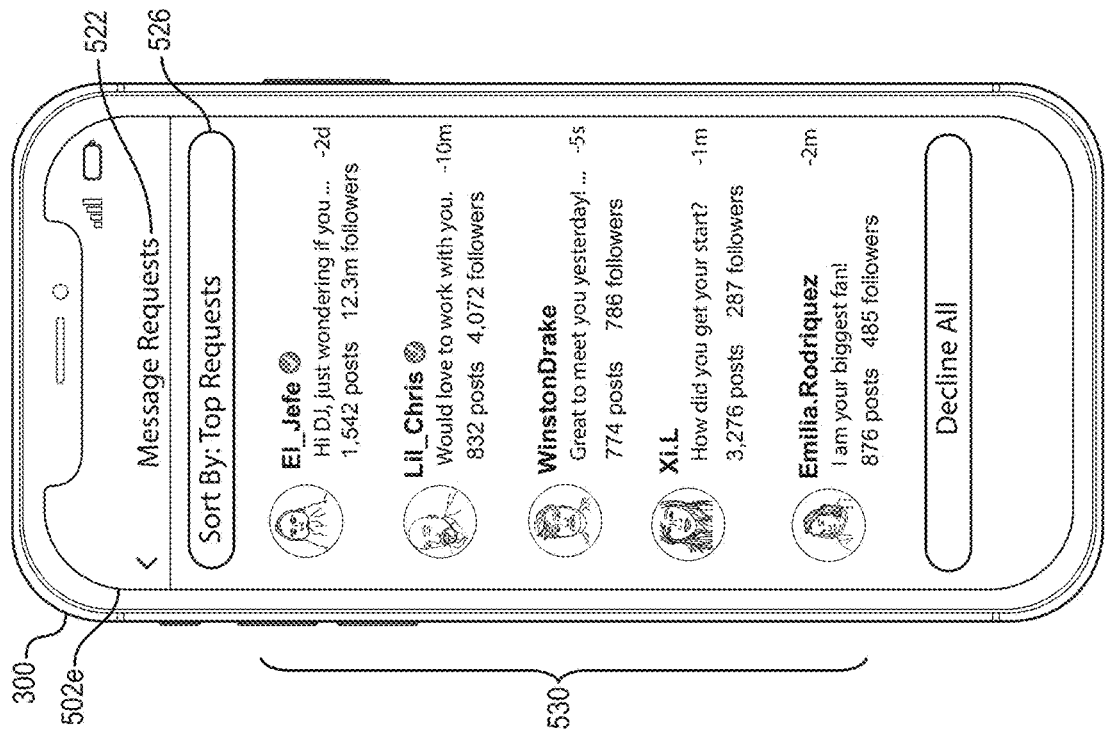

For example, the networking system application 214 provides an updated user interface 502*e* that includes prioritized message requests 530 based on the user input of the sort option Top Requests, as shown by FIG. 5E. Notably, the networking system application 214 changes the order of the prioritized message requests 530 shown in FIG. 5E relative to the order of the message requests 524 shown in FIG. 5C. Indeed, while the message requests 524 shown in FIG. 5C are arranged by the age of the message request, the networking system application 214 arranges the prioritized message requests 530 shown in FIG. 5E based on a combination of metrics (e.g., verification status, number of followers, age of message request, number of posts, and/or affinity). In some embodiments, the user interface 502*e* showing the prioritized message requests 530 is the default sort order of the message requests view 522 for all users having creator accounts.

Furthermore, the prioritized message requests 530 shown in FIG. 5E includes message requests that were not included in the message requests 524 shown in FIG. 5C. For example, based on the user engagement system 204 determining that the message request from El_Jefe was likely most relevant to the user, the user engagement system 204 prioritizes this message request at the top of the prioritized message requests 530. For the user to see this message request in the lists of message requests 524 shown in FIG. 5C, the user would likely have to first scroll through and view hundreds of message requests. In this manner, the prioritized message requests 530 reduces excesses user interact by the user to find relevant message requests as well as reduces computing resources needed to load and display less relevant message requests to the user.

Figure 6B:
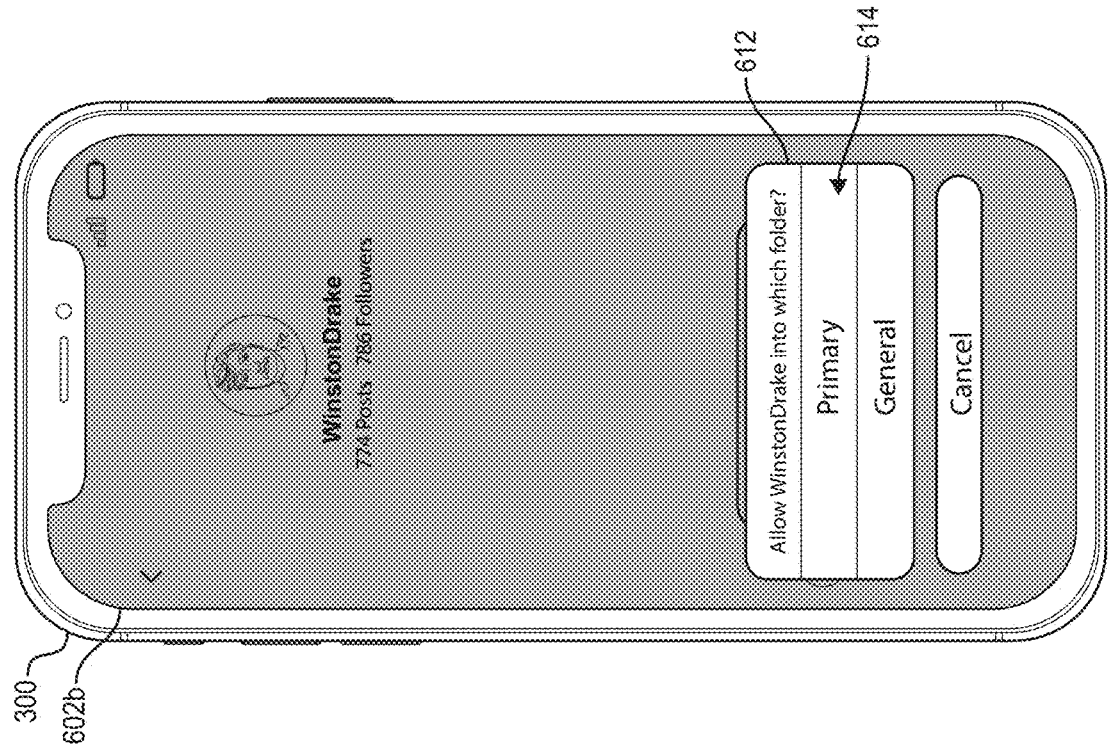
FIGS. 6A-6C illustrate the computing device with a user interface portraying messages organized into a message repository in accordance with one or more embodiments.
Figure 6A:
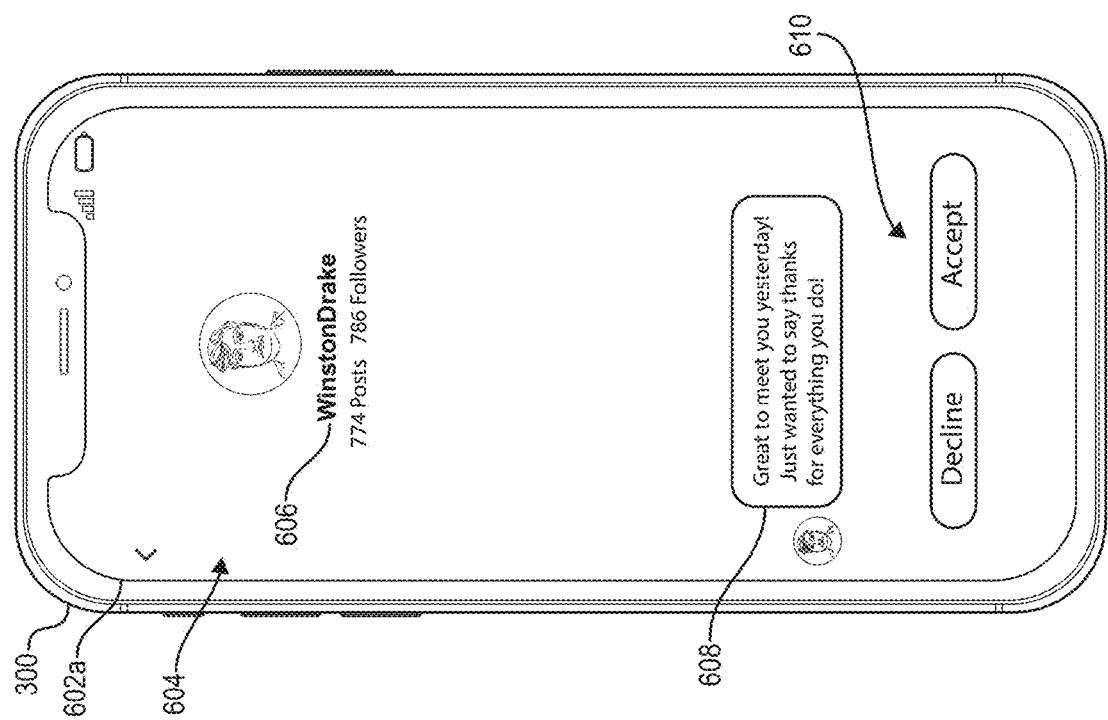
Figure 6C:
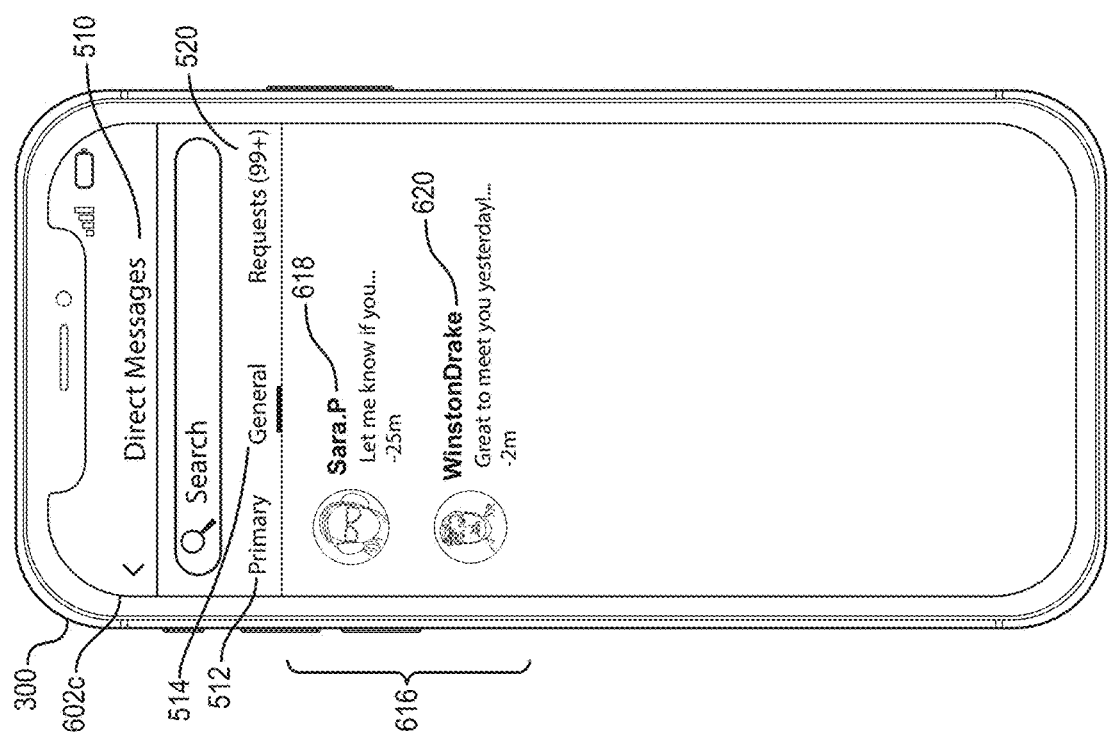

Turning now to FIGS. 6A-6C, additional detail is provided regarding the user interacting with a message request. In particular, FIGS. 6A-6C illustrate the client device 300 with user interfaces 602*a*-602*c* portraying messages organized into a message repository in accordance with one or more embodiments. For simplicity, the client device 300 shown in FIGS. 6A-6C corresponds to the client device 300 introduced in FIG. 3A.

More particularly, FIG. 6A illustrates a message request 604 from a co-user. For example, the networking system application 214 updates the user interface 602*a* to display the message request 604 in response to detecting the user selecting the message request from the message request view. As shown, the networking system application 214 provides the message request 604 with co-user information 606 of the co-user associated with the message request (e.g., the co-user that sent the message request). In addition, the networking system application 214 provides the message request 604 with a message 608 that initiated the message request.

Further, the networking system application 214 provides the message request 604 with selectable options 610 to accept or decline the message request. Upon examining the co-user information 606 and/or the message 608, the user can determine whether to accept the message request, decline the message request, or be unresponsive to the message request (e.g., ignoring or delaying the message request). For example, based on detecting the user selecting the selectable option 610 to accept the message request, the user engagement system 204 can enable the user to reply back to the message 608 (i.e., actively engage with the co-user).

In one or more embodiments, before enabling the user to actively engage with the co-user, the networking system application 214 prompts the user to classify the co-user and message. To illustrate, the networking system application 214 provides a user interface 602*b* that includes a repository selection element 612 prompting the user to select a repository option 614 as to where to store the message thread between the user and the co-user, as shown in FIG. 6B. While two repository options 614 are displayed, as described above, the user engagement system 204 can provide any number of message repositories.

As shown in FIG. 6C, the networking system application 214 can provide the user interface 602c to show the user's direct messages in the direct messages view 510. As described above in connection with FIG. 5B, the direct messages view 510 includes message repositories (e.g., message folders) including the primary message repository 512 and the general message repository 514.

Further, as shown in FIG. 6C, the networking system application 214 provide a general message repository 514. As shown, the general message repository 514 includes a first message 518 moved from the primary message repository 512 as well as a second message 520 from an accepted message request, as described above.

In various embodiments, the user engagement system 204 enables the user to set different preferences with respect to each message repository. For example, the user engagement system 204 enables a user to disable notifications or aggregate multiple notifications (e.g., one per day) for messages in a first repository while providing individual notifications for messages in a second repository. As another example, the user engagement system 204 enables a user to disable read receipts for messages in a particular message repository. Further, in some embodiments, the user engagement system 204 enables users to set specific preferences for individual messages in a repository that override the preferences set of the repository in which the message is maintained.

Figure 7:
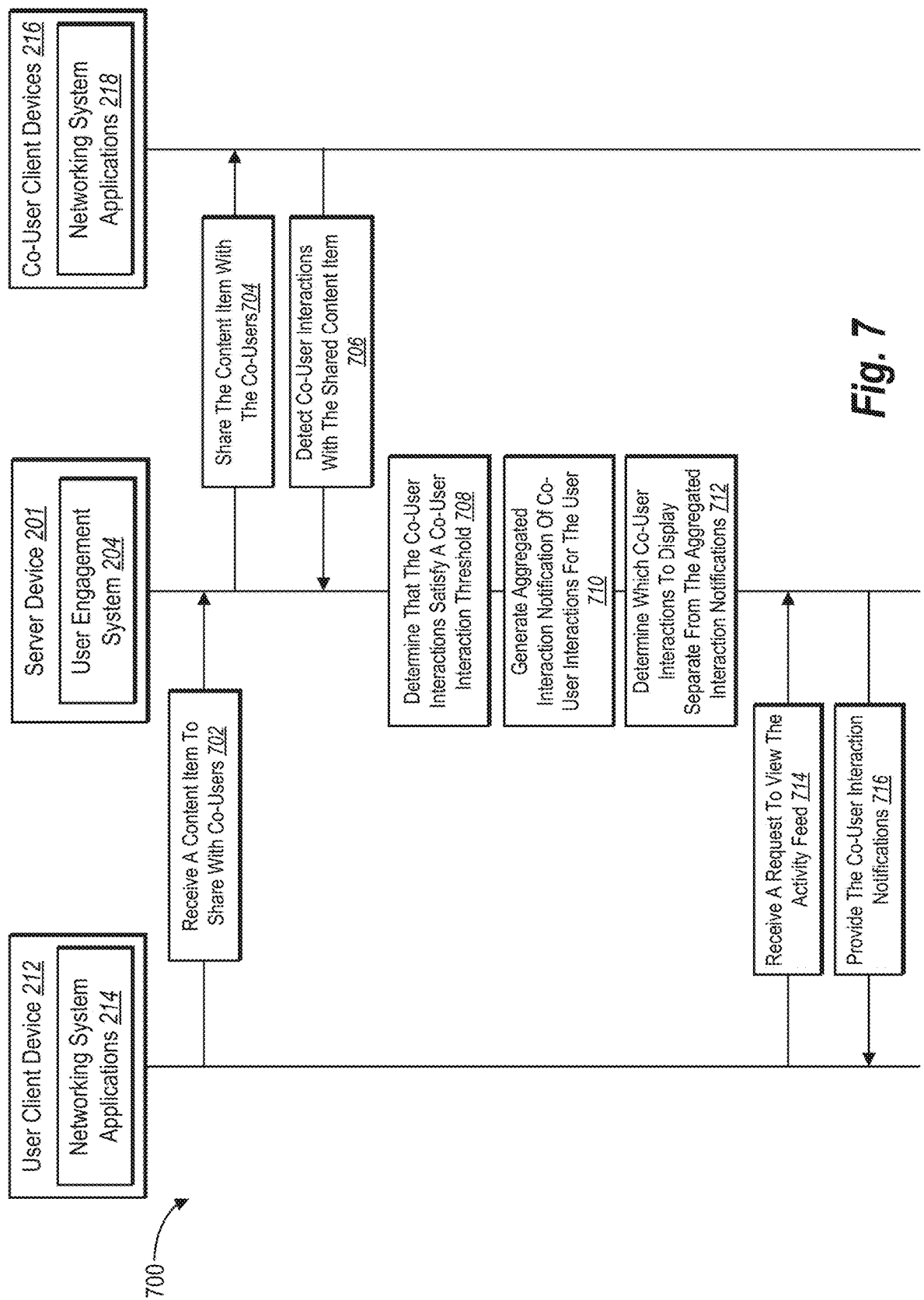
FIG. 7 illustrates a sequence diagram of generating aggregated interaction notifications in accordance with one or more embodiments.
Figure 8B:
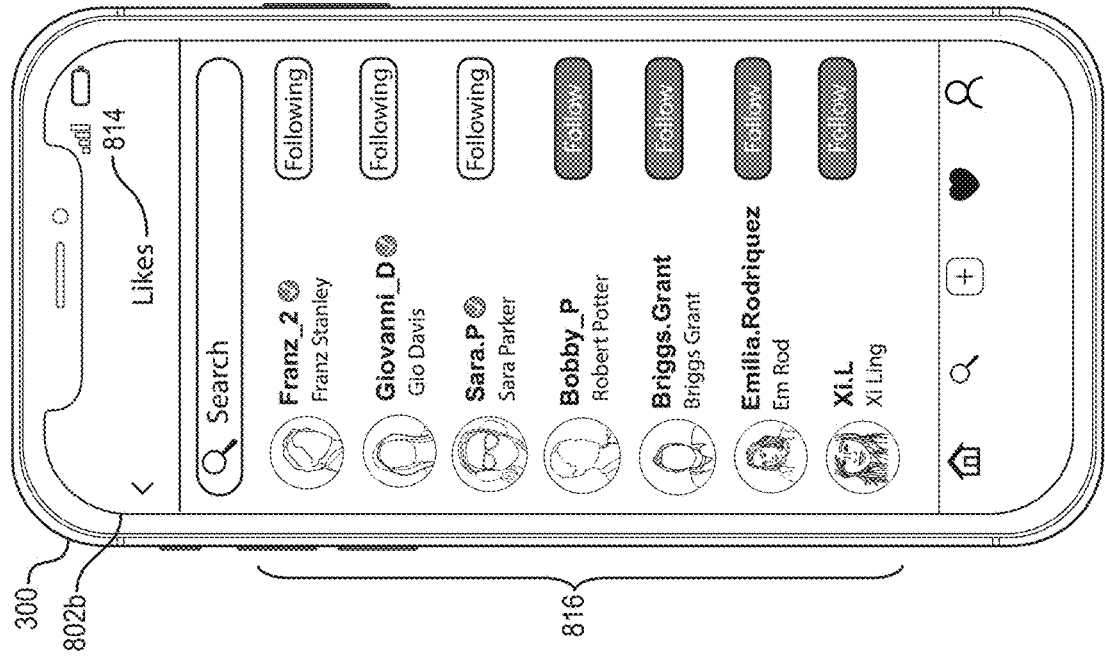
FIGS. 8A-8B illustrate the computing device with a user interface portraying aggregated interaction notifications in accordance with one or more embodiments.

Turning now to FIGS. 7-8B, additional detail is provided regarding the user engagement system 204 aggregating co-user interaction notifications for a user based on co-user interacting with content items shared by the user via the networking system. For instance, FIG. 7 illustrates a sequence diagram of generating aggregated interaction notifications in accordance with one or more embodiments. In particular, FIG. 7 illustrates a series of acts 700 of the user engagement system 204 generating aggregated interaction notifications for a user.

As shown, FIG. 7 includes the user engagement system 204, the user client device 212, and the co-user client devices 216 introduced above. Further, as shown, the series of act 700 includes an act 702 of the user engagement system 204 receiving a content item to share with co-users via the networking system. For example, the user provides a content item via the user client device 212 to the user engagement system 204 to be shared with co-users of the networking system. In response, the networking system shares the content item with the co-users of the user via the co-user client devices 216, as shown in the act 704 of the series of acts 700.

Additionally, the series of acts 700 includes an act 706 of detecting content item-user interactions with the shared content item. For example, upon a co-user reacting to the content item shared by the user, the user engagement system 204 detects the co-user interaction. As mentioned above, co-user interactions can include co-user accessing, browsing, viewing, experiencing, sharing, or reacting (e.g., "like," comment, provide a positive reaction, or provide a negative reaction) to the user's content item. For example, the networking system applications 214 on the co-user devices 216 send notifications to the user engagement system 204.

In various embodiments, the user engagement system 204 provides a notification to the user signaling a co-user's interaction with the shared content item. For example, the notification indicates the identity of the co-user along with how the co-user interacted with the shared content item (e.g., "Co-User A likes your shared content item" or "Co-User B commented on your shared content item"). In some embodiments, the user engagement system 204 includes a list of notifications in an activity feed provided by the user engagement system 204 via a corresponding application on the user's client device.

Depending on the number of followers and/or the number of shared content items by the user, the user may receive too many co-user interaction notifications. For instance, as mentioned above, activity feeds are often limited to a low number of notifications (e.g., 150) due to limited space restraints on mobile client devices and/or to prevent an overly lengthy feed. In these cases, a user with a large following may receive enough co-user interaction notifications in response to a shared content item to overflow the activity feed in a matter of seconds or minutes with less important co-user interaction notifications (e.g., a user's feed is filled with individual -user interaction notifications of co-user's liking the shared content item).

Indeed, the influx of co-user interaction notifications in the user's activity feed with less important co-user interaction notifications pushes out more meaningful co-user interaction notifications, which severely impedes the user from being able to engage with the co-users associated with the more meaningful co-user interaction notifications. In other cases, the massive volume of co-user interaction notifications disables the functionality of the user's activity feed altogether.

Accordingly, as shown in FIG. 7, the series of acts 700 includes an act 708 of the user engagement system 204 determining that the co-user interactions satisfy a notification threshold. For example, the user engagement system 204 determines if the user engagement system 204 determines whether one or more co-user interaction thresholds based on co-user interactions are satisfied for one or more corresponding time periods. To illustrate, in one or more embodiments, the user engagement system 204 can detect whether a first number of co-user interactions are detected for the user within a first time period (e.g., 50 co-user interactions in five). In addition, the user engagement system 204 can detect whether a second number of co-user interactions are detected for the user within a second time period (e.g., 100 co-user interactions in an hour).

In various embodiments, the user engagement system 204 determines a co-user interaction threshold based on co-user interaction types. For example, the user engagement system 204 determines that the number of likes of a content item shared by the user satisfies a likes notification threshold. Further, the user engagement system 204 determines that the number of new co-user followers does not satisfy a new followers notification threshold.

As shown, the series of acts 700 includes the act 710 of generating an aggregated interaction notification of co-user interactions for the user. For example, based on one or more of the co-user interaction thresholds being satisfied, the user engagement system 204 can determine to generate aggregated interaction notifications. In various embodiments, the user engagement system 204 generates an aggregated interaction notification for co-user interaction types for each content item. For instance, the user engagement system 204 generates a first aggregated interaction notification corresponding to co-user likes of a first content item and a second aggregated interaction notification corresponding to co-user shares of the first content item. In alternative embodiments, the user engagement system 204 generates an aggregated interaction notification for multiple co-user interaction types corresponding to a single content item shared by the user (e.g., "123 co-users liked and shared Content Item A.").

In some embodiments, the user engagement system 204 generates an aggregated interaction notification for multiple co-user interaction types corresponding to multiple content items shared by the user. For example, the user engagement system 204 generates an aggregated interaction notification corresponding to all content item likes by co-users within the last hour, day, or week (e.g., "The content items you shared yesterday got 344 likes.").

In some embodiments, the user engagement system 204 generates aggregated interaction notifications for a first type of co-user interaction (e.g., likes) but not for a second type of co-user interaction (e.g., comments). For instance, the user engagement system 204 provides a single aggregated interaction notification indicating all of the likes for a content item shared by the user while also providing individual co-user interaction notifications for each comment made by co-users within the comment section of the content item.

In addition, the series of acts 700 includes the act 712 of determining which co-user interactions to display separate from the aggregated interaction notifications. For example, in various embodiments, the user engagement system 204 detects that a particular co-user important to the user (e.g., a close friend or family member) interacts with a content item shared by the user. Based on this detection, the user engagement system 204 can determine to provide a co-user interaction notification to the user separate from the aggregated interaction notification corresponding to the same content item and the same interaction type (e.g., liking the content item). In some embodiments, the act 712 is optional and skipped by the user engagement system 204.

In various embodiments, the user engagement system 204 determines whether to generate a separate co-user interaction notification for a co-user based on whether the user has actively engaged the co-user via the networking system, as described above, and in additional cases, based on when the user last actively engaged with the co-user. In some embodiments, the user engagement system 204 determines whether to generate a separate co-user interaction notification for a co-user based on whether the co-user is found in a particular message repository. For example, the user engagement system 204 determines that co-users having a message thread in the "Sponsor" message repository merit a separate co-user interaction notification.

As shown, the series of acts 700 includes the act 714 of receiving a request from the user via the user client device 212 to view the user's activity feed. For example, the user navigates to their activity feed within the networking system application (e.g., a web browser application or a native application on the client device) on the user client device 212. In response, the user engagement system 204 detects the user requesting to view their activity feed of co-user interactions. In some embodiments, the user engagement system 204 sends a pre-loaded activity feed the user's activity feed each time it is updated.

Moreover, the series of acts 700 includes the act 716 of providing the co-user interaction notifications to the user via the user client device 212. In various embodiments, the user engagement system 204 provides an activity feed that includes both aggregated interaction notifications as well as single co-user interaction notifications. An example user's activity feed is provided below in connection with FIGS. 8A.

Figure 8A:
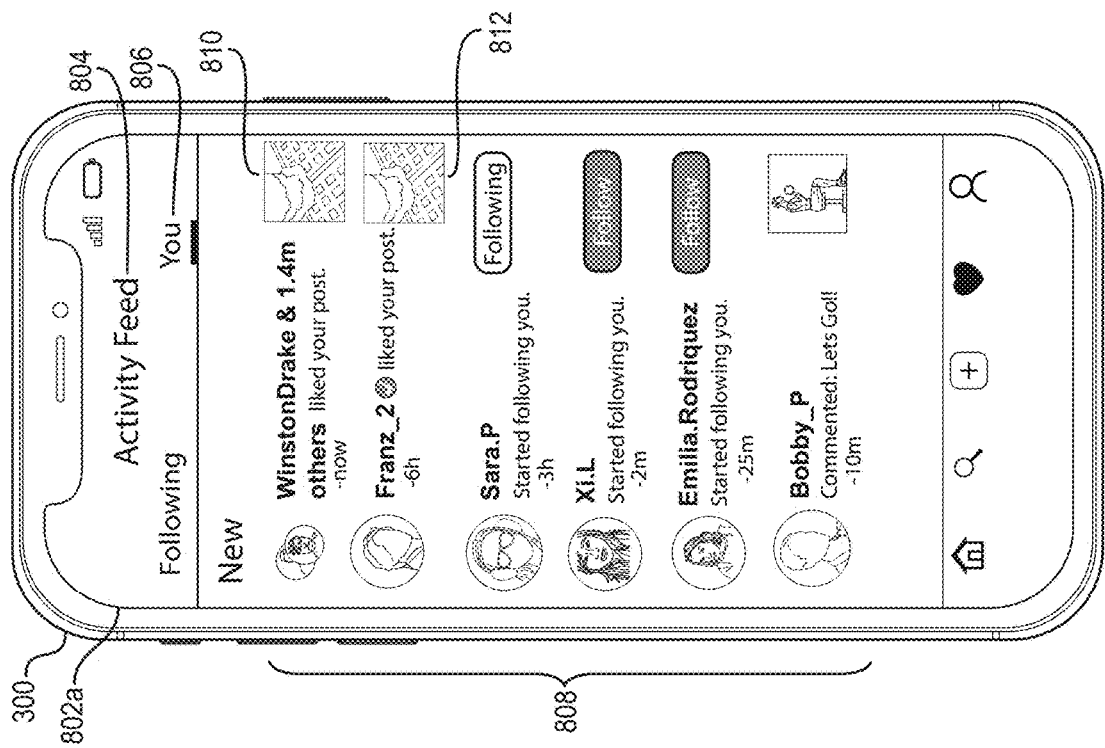

In particular, FIGS. 8A-8B illustrate a client device 300 with user interfaces 802a-802b portraying aggregated interaction notifications in accordance with one or more embodiments. In particular, FIGS. 8A-8B illustrate the client device 300 with user interfaces 802a-802b portraying a user's activity feed in accordance with one or more embodiments. For simplicity, the client device 300 shown in FIGS. 8A-8B corresponds to the client device 300 introduced in FIG. 3A.

More particularly, FIG. 8A illustrates the networking system application 214 providing a user interface 802a displaying an activity feed view 804 of the user. As shown, the networking system application 214 can provide an activity feed view 804 that includes sub-views 806 including a "Following" sub-view that includes activity notifications corresponding co-users the user is following as well as a "You" sub-view. As shown, the "You" sub-view is selected and includes co-user interaction notifications with respect to co-users interacting with content items shared by the user.

As also shown, the activity feed view 804 includes co-user interaction notifications 808. The co-user interaction notifications 808 include an aggregated interaction notification 810 as well as a single co-user interaction notification 812 for the same content item shared by the user. In addition, the co-user interaction notifications 808 can provide additional detail regarding co-users and content items as well as provide selectable options for the user (e.g., follow a user), as shown.

In one or more embodiments, the user engagement system 204 organizes the co-user interaction notifications 808 based on relevance to the user. For instance, the user engagement system 204 can utilize one or more of the metrics described above in connection with message requests to rank and prioritize the co-user interaction notifications 808 shown in the activity feed. For example, the user engagement system 204 ranks the co-user interaction notifications 808 based on age, affinity, and co-user interaction type.

In addition, while the activity feed view 804 displays one aggregated interaction notification, in various embodiments, the networking system application 214 includes multiple aggregated interaction notifications corresponding to multiple content items and/or co-user interaction types. For example, the user engagement system 204 aggregates the co-user following interaction notifications into an aggregated interaction notification when the number of co-user following interactions satisfies a threshold value.

As mentioned above, the co-user interaction notifications 808 can provide selectable options to the user. For example, the user selects the aggregated interaction notification 810 to view a list of co-users that liked the content item shown in the aggregated interaction notification 810. To illustrate, FIG. 8B shows the networking system application 214 providing a user interface 802b displaying a likes view 814 for the content item shown in the aggregated interaction notification 810. In particular, the likes view 814 shows a list of co-users 816 that have liked the content item shown in the aggregated interaction notification 810. The networking system application 214 can provide selectable options to enable the user to further select and engage with each listed co-user.

Figure 9:
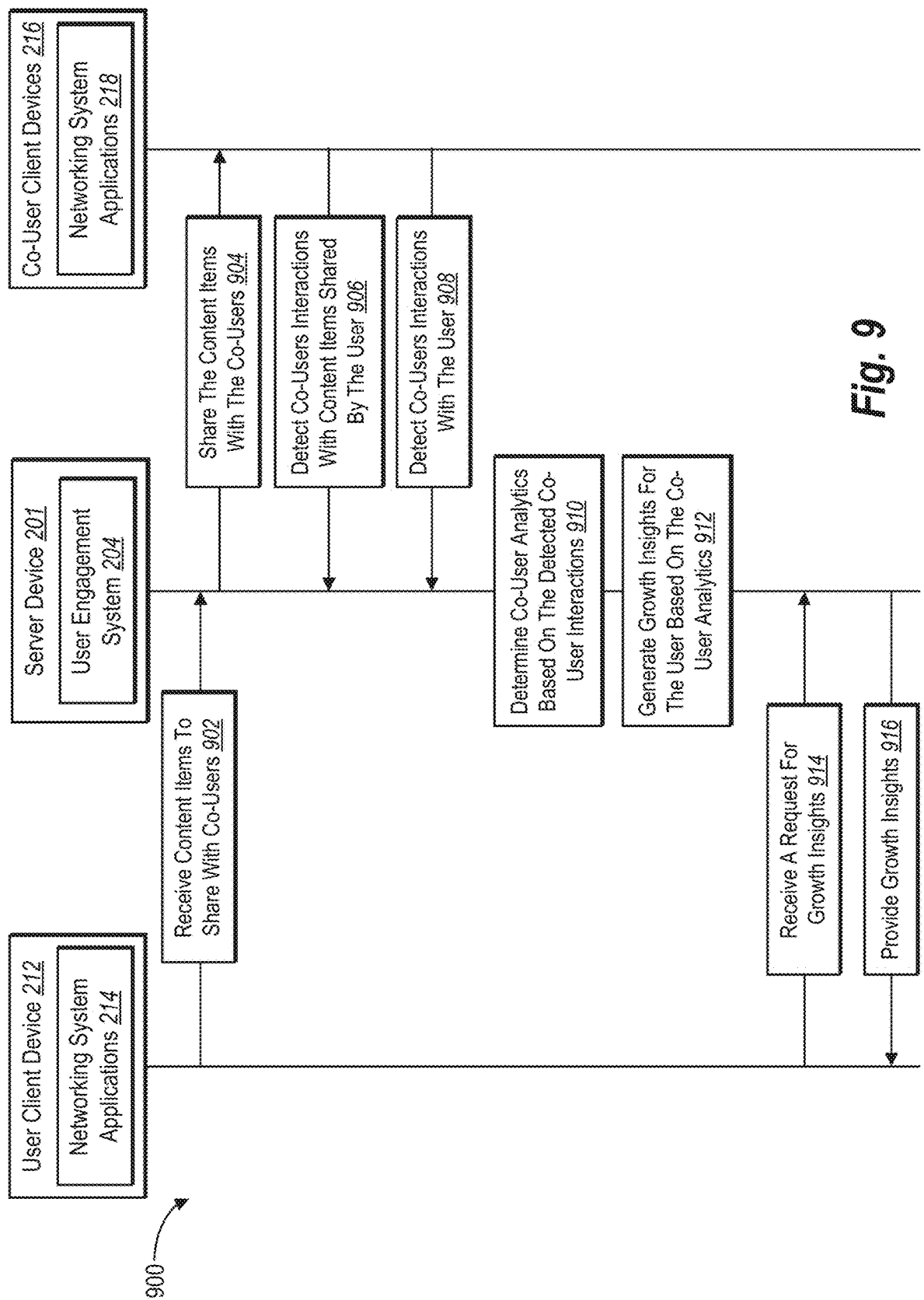
FIG. 9 illustrates a sequence diagram of generating growth insights in accordance with one or more embodiments.
Figure 10B:
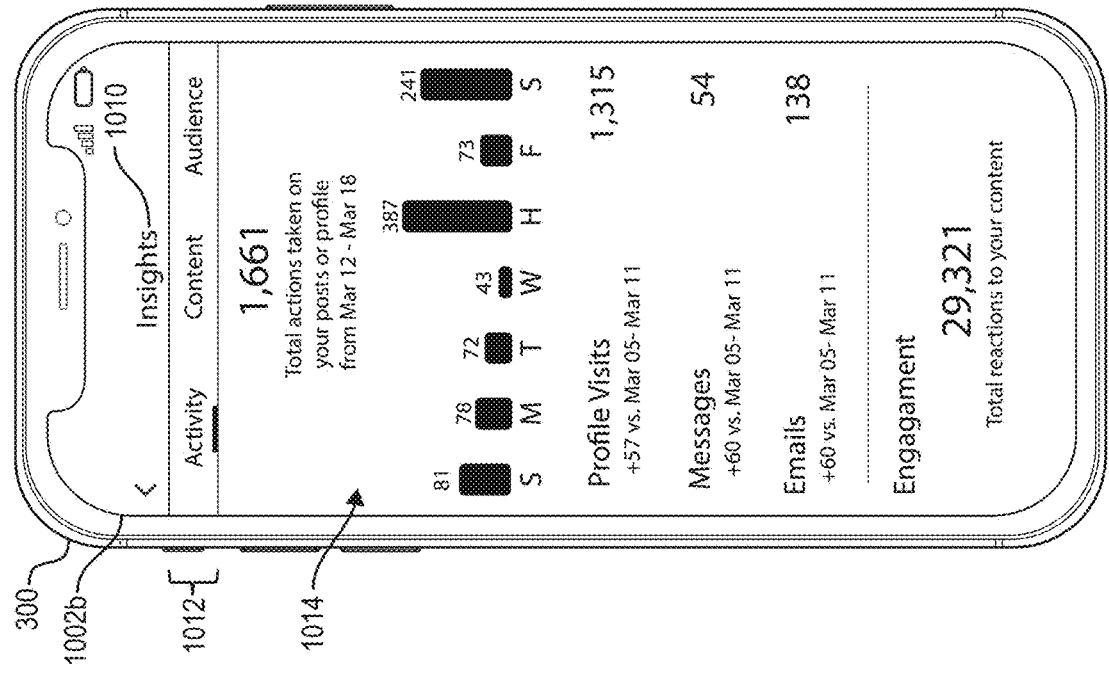
FIGS. 10A-10E illustrate the computing device with a user interface portraying secure growth insights for a user account in accordance with one or more embodiments.
Figure 10A:
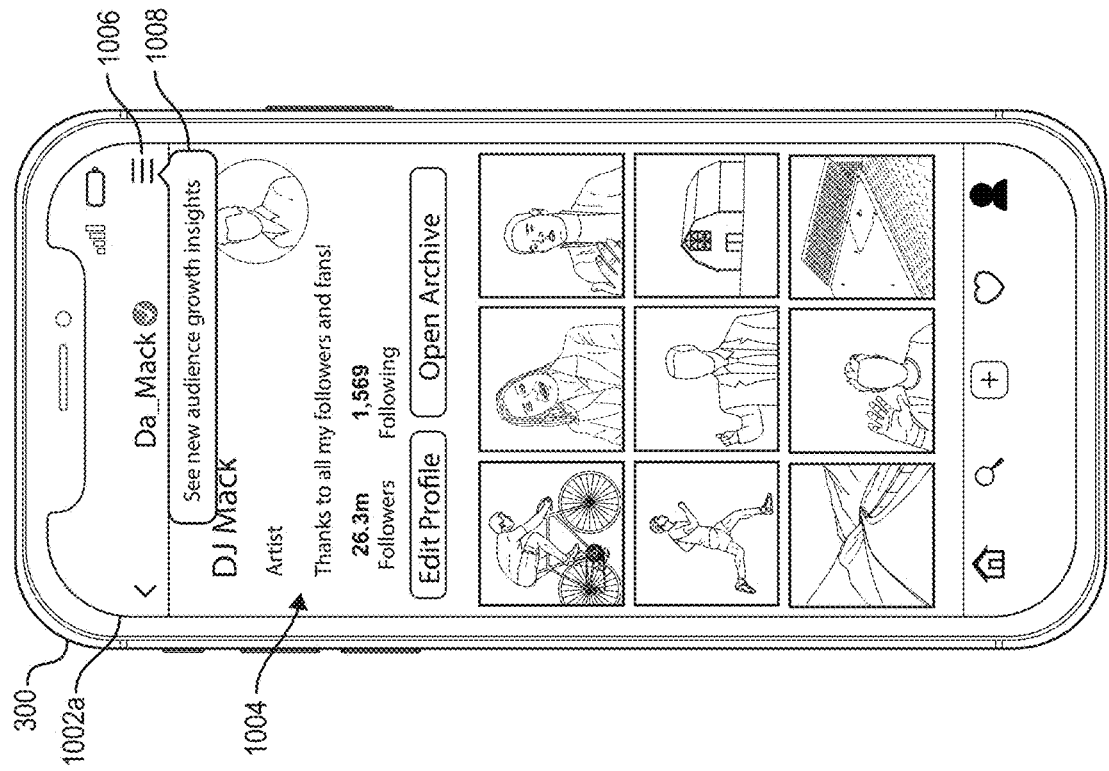
Figure 10D:
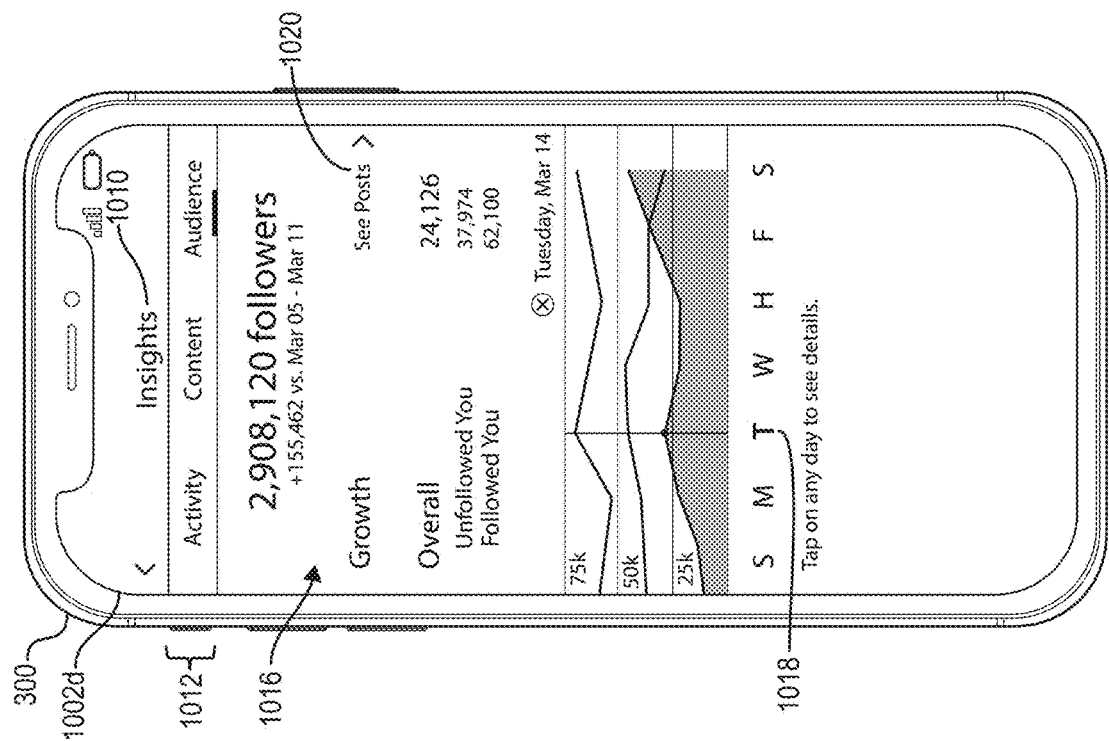
Figure 10C:
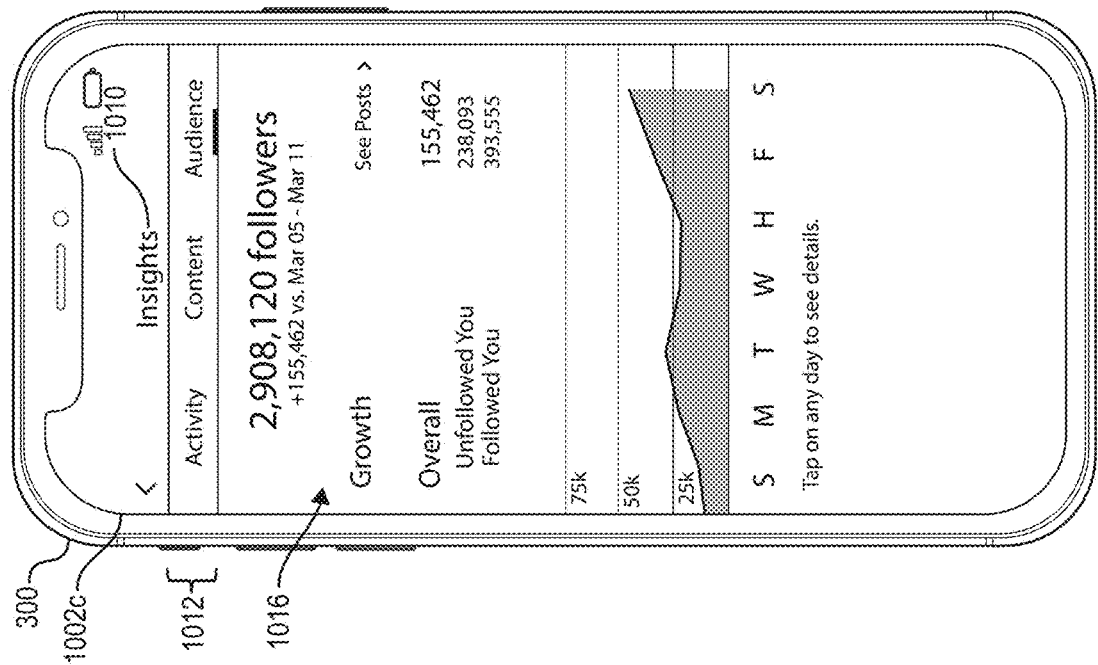
Figure 10E:
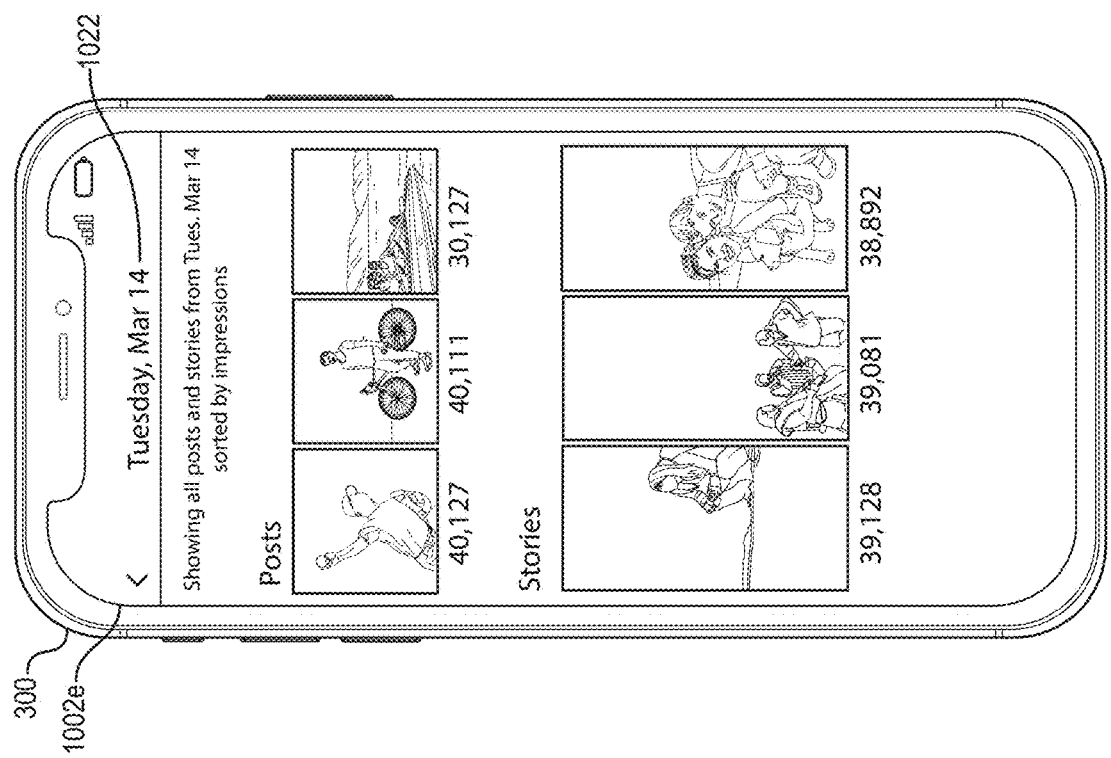

Turning now to FIGS. 9-10E, additional detail is provided regarding the user engagement system 204 providing co-user growth insights to the user with respect to the networking system. For instance, FIG. 9 illustrates a sequence diagram of generating growth insights in accordance with one or more embodiments. In particular, FIG. 9 illustrates a series of acts 900 of the user engagement system 204 detecting and generating co-user growth insights to the user with respect to the networking system.

As shown, FIG. 9 includes the user engagement system 204, the user client device 212, and the co-user client devices 216 introduced above. Further, as shown, the series of act 900 includes an act 902 of the user engagement system 204 receiving content items to share with co-users via the networking system. For example, the user provides one or more content items via the user client device 212 to the user engagement system 204 to be shared with co-users of the networking system. Also, the series of acts 900 includes an act 904 of sharing the content items with the co-users by providing the shared content items to the co-user client devices 216 associated with the co-users.

In addition, the series of acts 900 includes an act 906 of the user engagement system 204 detecting co-user interactions with content items shared by the user. As described above, in various embodiments, the user engagement system 204 detects when and how co-users interact with content items shared by as a user. For example, the user engagement system 204 tracks co-user reactions such as likes, comments, and shares with respect to content items shared by the user.

Similarly, the series of acts 900 includes an act 908 of the user engagement system 204 detecting co-user interactions with the user. For instance, in addition to interacting with content items shared by the user, co-users can engage the user directly (e.g., via the user's account profile) via the networking system. For example, a co-user can follow, unfollow, mute, direct message, tag, or mention the user irrespective of any content item shared by the user. In these cases, the user engagement system 204 can monitor and detect when and how co-users interact with the user.

The series of acts 900 also includes an act 910 of the user engagement system 204 determining co-user analytics based on the detected co-user interactions. For example, the user engagement system 204 determines co-user analytics based on co-user interactions with content items shared by the user as well as co-user interactions directly with the user.

In various embodiments, the user engagement system 204 determines trends and patterns in connection with the co-user interactions with the user (e.g., direct co-user interactions and indirect co-user interactions with content items shared by the user). For example, the user engagement system 204 determines what type of co-users interact with the user, times of the day when co-users interact with the user, how co-users interact with the user, and/or when co-users follow or unfollow the user.

In some embodiments, the user engagement system 204 determines co-user analytics based on monitoring and tracking specific data streams. For example, the user engagement system 204 generates a data stream that tracks when co-users uniquely follow or unfollow a user. For instance, if a co-user follows the user, then unfollows the user, and again follows the user within a predetermined time period (e.g., a day or a week), the user engagement system 204 detects that the same co-user (e.g., based on a matching co-user identifier) is performing multiple actions with a net result of the co-user following the user. Thus, the unique follow/unfollow count for the time period based on the co-user is one new follower for the user, not two co-user follows and one co-user unfollow for the user.

As shown, the series of acts 900 includes the act 912 of the user engagement system 204 generating growth insights for the user based on the co-user analytics. For example, in one or more embodiments, the user engagement system 204 generates co-user growth insights (e.g., a report) that includes one or more of the determined co-user analytics.

Further, the user engagement system 204 can generate co-user growth insights that correspond to a specific time period (e.g., day or week) and/or specific shared content items. Examples of co-user growth insights are shown in FIGS. 10A-10E, described below.

Additionally, the series of acts 900 includes the act 914 of the user engagement system 204 receiving a request from the user via the user client device 212 for growth insights. For example, the user navigates to an audience growth area within the networking system application corresponding to the networking system on the user client device 212. In response, the user engagement system 204 detects the user requesting growth insights. In some embodiments, the user engagement system 204 pre-loads the growth insights on the user client device 212.

Moreover, the series of acts 900 includes the act 916 of providing growth insights to the user via the user client device 212. In various embodiments, the user engagement system 204 enables the user to interact with portions of the growth insights to reveal specific insights pertaining to a specific time period (e.g., a day or a week) and/or specific shared content items. As mentioned above, examples of growth insights are shown in connection with FIGS. 10A-10E, described below.

FIGS. 10A-10E illustrate a client device 300 with user interfaces 1002a-1002e providing growth insights to a user. In particular, FIGS. 10A-10E illustrate the client device 300 with user interfaces 1002a-1002e portraying secure growth insights for a user account in accordance with one or more embodiments. For simplicity, the client device 300 shown in FIGS. 10A-10E corresponds to the client device 300 introduced in FIG. 3A.

As shown in FIG. 10A, the networking system application 214 provides a user interface 1002a displaying a user profile page 1004 of the user (i.e., D J Mack). As shown, the user profile page 1004 includes information about the user such as a publicly shared user description (e.g., the user's bio), co-user stats (e.g., number of followers and number of followings), and shared content items. In addition, the user profile page 1004 includes various options for the user to customize his or her account and profile.

To illustrate, the networking system application 214 provides the user profile page 1004 to include a selectable settings element 1006 that displays one or more user-customizable settings and/or additional features. In various embodiments, upon detecting a user selecting the selectable settings element 1006, the networking system application 214 causes the user interface 1002a to reveal a pane having additional options including an option. For example, the pane reveals an option for the user to view insights associated with the user's account. In some embodiments, the user interface 1002a includes a selectable insights element directly on the user profile page 1004 (e.g., adjacent to the selectable settings element 1006).

Furthermore, in additional embodiments, the networking system application 214 can display an insights popup element 1008 that indicates that new growth insights are now associated with previously provided insights. For instance, the networking system application 214 provides the insights popup element 1008 based on the user switching to a creator account and having new growth insight tools enabled on the user's account.

Additionally, the networking system application 214 can provide an insights view 1010, as shown by FIG. 10B. For example, the networking system application 214 displays the insights view 1010 in the user interface 1002b in response to the user selecting an insights option in connection with the selectable settings element 1006 from FIG. 10A, as described above.

As shown in FIG. 10B, the networking system application 214 configures the insights view 1010 to include multiple sub-views 1012 including an activity sub-view that includes co-user engagement insights, a content sub-view that includes insights based on shared content items, and an audience sub-view that includes co-user growth insights (described below). As also shown, the activity sub-view is selected, which causes the networking system application 214 to include co-user engagement insights 1014. For example, the networking system application 214 configures the co-user engagement insights 1014 to show, for a given week, the total co-user actions over (divided by day), the number of profile visits, the number of messages, the number of emails, and total reactions. Further, the networking system application 214 can configure the co-user engagement insights 1014 to provide indications of how some of these engagements have changed since the previous week.

As shown by FIG. 10C, the networking system application 214 can provide a user interface 1002c where the audience sub-view is selected from among the multiple sub-views 1012. Selecting the audience sub-view causes the networking system application 214 to show co-user growth insights 1016 to help the user grow their audience or following within the networking system. As shown, the co-user growth insights 1016 include growth accounting measurements such as the total number of followers as well as growth information indicating the growth rate of the user's account. In addition, the co-user growth insights 1016 include trends, changes, and graphics showing how the number of co-users following the user's account has changed for a given week. For example, the co-user growth insights 1016 provide a number of unique co-users (e.g., no-duplicative co-users) that have unfollowed and followed the user for the given week.

In some embodiments, the user engagement system 204 can provide growth insights having greater granularity. For instance, the networking system application 214 enables the user to interact with the co-user growth insights 1016 to reveal a more-detailed level of growth insights. For example, upon detecting a user selecting of the unfollowed users, the networking system application 214 can provide the user with the number of bots and/or bad accounts that were removed from the networking system. As another example, in response to the user detecting a particular day within the graph shown in the co-user growth insights 1016, the networking system application 214 updates the co-user growth insights 1016 to show growth insights for the selected day (or another selected time period).

To illustrate, FIG. 10D shows a user interface 1002d provided by the networking system application 214 based on detecting the user selecting a selectable day element 1018 within the graph. As shown, the networking system application 214 provides an updated co-user growth insights 1016 including the number of unique co-users that have unfollowed and followed the user for the selected day. In addition, the networking system application 214 updates the graph to show how unfollows and follows have changed each day of the week including the selected day.

As a note, while the co-user growth insights 1016 in FIGS. 10C-10D show various example growth insights, the user engagement system 204 can provide additional or alternative growth insights. Further, as mentioned above, the user engagement system 204 can provide the co-user growth insights 1016 without requiring the user to provide their credentials to a third-party service, which may compromise the user's privacy and undermined the security of the user's account. Instead, the user engagement system 204 natively provides the user the co-user growth insights 1016. Further, as mentioned above, the user engagement system 204 provides the user with accurate and reliable co-user growth insights 1016 that are not possible from third-party services.

As described above, a user can interact with the co-user growth insights 1016 to view more details for a given insight. For instance, the co-user growth insights 1016 in FIG. 10D also include a content item insights selectable element 1020. Depending on whether the user has selected a particular day (e.g., via the selectable day element 1018) or is viewing co-user growth insights for a given week, any content item insights provided upon selecting the content item insights selectable element 1020 may correspond to the selected day or the given week.

To illustrate, FIG. 10E shows a user interface 1002e of content item insights 1022 for the selected day (i.e., March 14) shown in FIG. 10D. For instance, the networking system application 214 updates the user interface 1002e to display the content item insights 1022 in response to detecting the user selecting the content item insights selectable element 1020 shown in FIG. 10D.

As illustrated, the content item insights 1022 show content items shared by the user for the selected day. In various embodiments, such as the illustrated embodiment, the content items are separated by content item type. For example, the content item insights 1022 shows posts and stories shared by the user. In addition, as shown, the content item insights 1022 includes the number of likes for each shared content item.

In further embodiments, the user engagement system 204 can include additional or alternative information (e.g., statistic and analytics) for each displayed content item. For example, the user engagement system 204 includes the number of unfollows and follows that occurred in response to a co-user engaging with a particular content item shared by the user. In this manner, the user engagement system 204 provides the user with co-user growth insights showing which content items increased a user's audience as well as which content items resulted in a decreased following.

Figure 11:
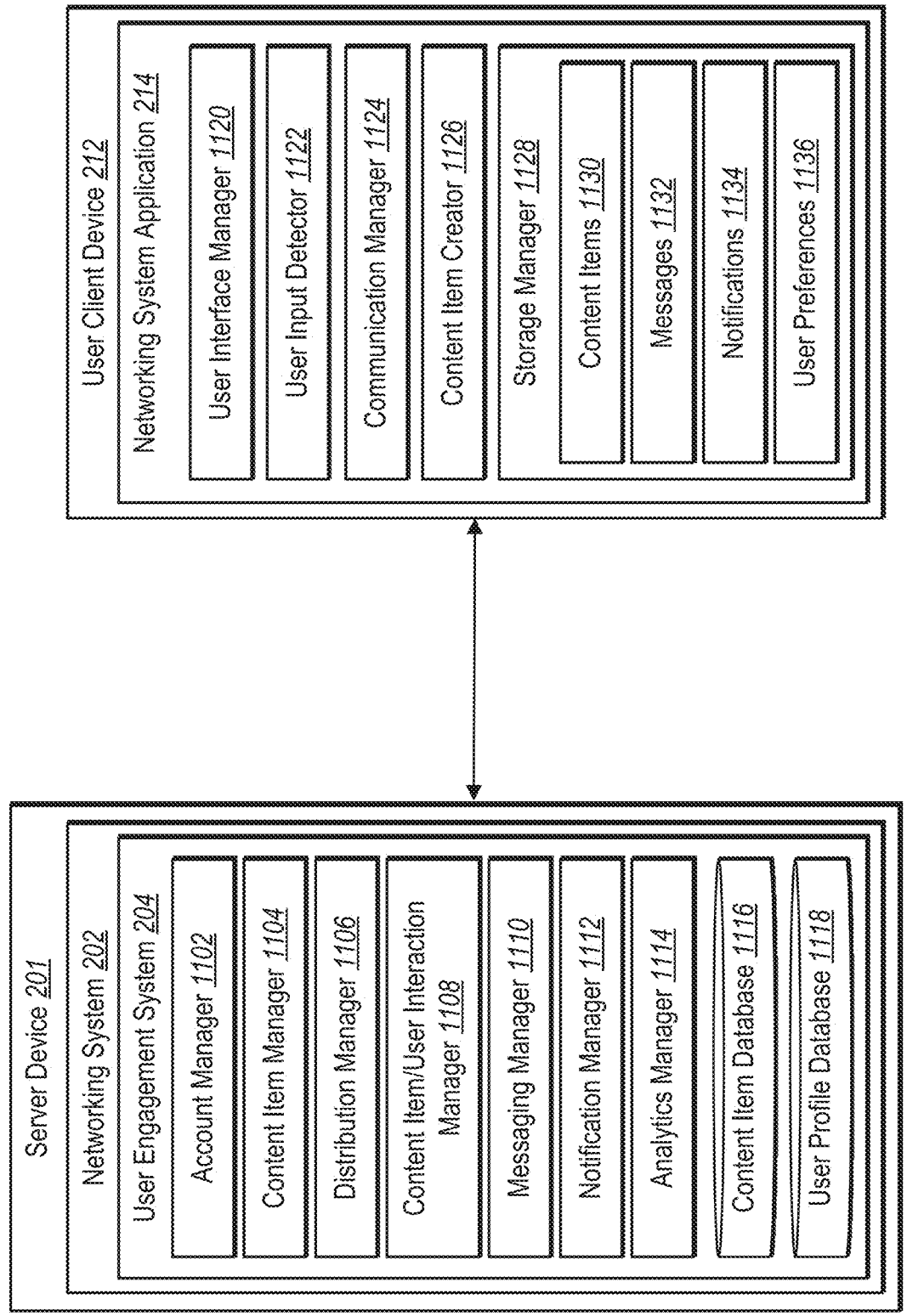
FIG. 11 illustrates an example architecture of the user engagement system within the networking system in accordance with one or more embodiments.

Turning now to FIG. 11, additional detail is provided regarding components and capabilities of the user engagement system 204 in accordance with one or more embodiments. As shown, the user engagement system 204 is implemented by the server device 201. In other embodiments, the components of the user engagement system 204 can be implemented across multiple computing devices, such as the server device 201 and the user client device 212 and/or other devices not shown (e.g., the co-user client devices 216).

As shown in relation to FIG. 11, the server device 201 includes the networking system 202 having the user engagement system 204, both of which are introduced above in connection with FIG. 2. As also shown, the user engagement system 204 includes an account manager 1102, a content item manager 1104, a distribution manager 1106, a content item/user interaction manager 1108, a messaging manager 1110, a notification manager 1112, and an analytics manager 1114. Further, the user engagement system 204 includes a content item database 1116 and a user profile database 1118. Additional detail regarding each of the components 1102-1118 will be provided in turn.

The account manager 1102 (i.e., a networking system account manager) can identify, generate, monitor, and/or manage network accounts. For example, the network system can generate one or more network accounts for a user and generate information (in accordance with privacy permissions) regarding the network account. For example, the account manager 1102 can identify other users with permissions to view content items from the network account or share content items to the network account (e.g., friends). In addition, the account manager 1102 can enable a user to customize their account profile via a number of options and settings. Further, the account manager 1102 can store, maintain and access user account information in the user profile database 1118.

The content item manager 1104 can create, modify, edit, remove, monitor, distribute, share and/or manage content items with the networking system 202. For example, the content item manager 1104 enables users to generate content items of various content item types. Further, the content item manager 1104 stores content item for users in the content item database 116. In addition, the content item manager 1104 can maintain statistics and information associated with each content item.

The distribution manager 1106 can facilitate, access, sharing, and/or distribution of content items shared or posted by users of the networking system 202. For example, as described above, users of the networking system 202 share content items with co-users of the networking system 202. Accordingly, the distribution manager 1106 can manage the distribution and sharing of content items. Further, the distribution manager 1106 can facilitate distributing content items to other networking systems, such as a social networking system.

The content item/user interaction manager 1108 can detect, monitor, track, determine, receive, and/or identify interactions of co-users with respect to a user via the networking system 202. For example, the content item/user interaction manager 1108 detects when co-users interact with content items shared by the user, as described above. As also described above, the content item/user interaction manager 1108 detect when co-users interact directly with the user. In addition, the content item/user interaction manager 1108 can report co-user interactions to one or more other components of the user engagement system 204.

The messaging manager 1110 can create, edit, send, receive, monitor, identify, determine, initiate, facilitate, move, store, and/or remove electronic messages between users of the networking system 202. For example, as described above, the messaging manager 1110 can generate message requests for co-users sending messages to users when the users have not actively interacted with the co-users. Further, the messaging manager 1110 can maintain and/or manage message repositories, as described above.

The notification manager 1112 can create, send, receive, monitor, identify, determine, initiate, facilitate, and/or remove notifications. In various embodiments, the notification manager 1112 generates notifications in response to user activity detected on the networking system 202. For example, the notification manager 1112 generates aggregated co-user interaction notifications as well as individual co-user interaction notifications, as described above.

The analytics manager 1114 can detect, monitor, track, determine, receive, generate, analyze, examine, and/or identify analytics corresponding the users of the networking system 202. For example, the analytics manager 1114 generates co-user growth insights as described above. In addition, the analytics manager 1114 can provide a variety of information to users based on content items shared by the users and/or co-user interactions with respect to the user, as explained above.

As mentioned above, the user engagement system 204 and/or the networking system 202 maintains a content item database 116 and a user profile database 1118. In some embodiments, the content item database 116 can maintain content items for users of the networking system 202 including information about co-user interactions with shared content items. In various embodiments, the user profile database 1118 maintains information corresponding to users, such as user account information. In some embodiments, the user profile database 1118 includes social graph information such as edge data and node data. Additional detail regarding the social graph, edges, and nodes is provided below in relation to FIGS. 14-15.

As shown, the user client device 212 includes the networking system application 214 introduced above with respect to FIG. 2. As described previously, the networking system application 214 can be a native application or a general application (e.g., a web browser application) that access the user engagement system 204. As shown, the networking system application 214 includes a user interface manager 1120, a user input detector 1122, a communication manager 1124, a content item creator 1126, and a storage manager 1128. Additional detail regarding each of the components 1120-1136 will be provided in turn.

The user interface manager 1120 can provide, manage, and/or control a graphical user interface (or simply "user interface"). Indeed, the user interface manager 1120 can generate, create, update, change, replace, delete, remove, refresh, render, reveal, display, present, and/or provide user interfaces associated with the networking system 202 to a user associated with the user client device 212. In general, the networking system application 214 (in connection with the user client device 212) implements the interface manager 1120 by generating and providing user interfaces (e.g., views). Examples of user interfaces generated and provided by the interface manager 1120 include one or more user account interfaces, content item interfaces, messaging interface, activity feed interfaces, notification feed interfaces, an insights interfaces, and other interfaces associated with the networking system 202.

In addition, the user interface manager 1120 may generate and display a user interface by way of a display screen composed of a plurality of graphical components, objects, and/or elements that allow a user to perform a function. The user interface manager 1120 can present a variety of types of information, including text, content items, images, video, audio, accounts, or other information (e.g., as illustrated above with regard to the user interfaces 302a-302f, 502a-502e, 602a-602c, 802a-802b, 1002a-1002e).

The user input detector 1122 can detect, receive, and/or facilitate user input on the user client device 212 in any suitable manner. In some instances, the user input detector 1122 detects one or more user interactions (e.g., a single interaction, or a combination of interactions) with respect to a user interface. For example, the user input detector 1122 detects a user interaction from a keyboard, mouse, touch page, touch screen, and/or any other input device in connection with the user client device 212. Utilizing data from the user input detector 1122, the networking system application 214 and/or user client device 212 can communicate with the user engagement system 204 on the server device 201 to provide updated content and response to the user on the user client device 212 based on the user input of the user.

The communication manager 1124 can manage digital communications to or from the user client device 212. For example, the communication manager 1124 can transmit select content items to the server device 201 (e.g., for posting via the networking system 202). Similarly, the communication manager 1124 can receive content items and other data associated with the networking system and the user from the server device 201.

The content item creator 1126 can create, modify, edit, delete, and/or hide content items for a user in connection with the networking system 202. For example, the content item creator 1126 enables a user to create and provide content items to the networking system 202 (e.g., via the communication manager 1124) to be shared with co-users of the networking system 202. In some embodiments, the content item creator 1126 enables a user to access, view, and/or modify content items previously shared by the user via the networking system 202.

The storage manager 1128 maintains data for the user engagement system 204 at the user client device 212. The storage manager 1128 can maintain data of any type, size, or kind, as necessary to perform the functions of the user engagement system 204. For example, as shown, the storage manager 1128 maintains data including content items 1130, messages 1132, notifications 1134, and user preferences 1136.

The components 1102-1136 can include software, hardware, or both. For example, the components 1102-1136 include one or more instructions stored on a computer-readable storage medium and executable by processors of one or more computing devices, such as a client device or server device. When executed by the one or more processors, the computer-executable instructions of the server device 201, user client device 212, client device 300, and/or the user engagement system 204 can cause the computing device(s) to perform the feature learning methods described herein. Alternatively, the components 1102-1136 can include hardware, such as a special-purpose processing device to perform a certain function or group of functions. Alternatively, the components 1102-1136 can include a combination of computer-executable instructions and hardware.

Furthermore, the components 1102-1136 are, for example, implemented as one or more operating systems, as one or more stand-alone applications, as one or more modules of an application, as one or more plug-ins, as one or more library functions or functions called by other applications, and/or as a cloud computing model. Thus, the components 1102-1136 can be implemented as a stand-alone application, such as a desktop or mobile application. Furthermore, the components 1102-1136 can be implemented as one or more web-based applications hosted on a remote server. The components 1102-1136 can also be implemented in a suite of mobile device applications or "apps."

Figure 12:
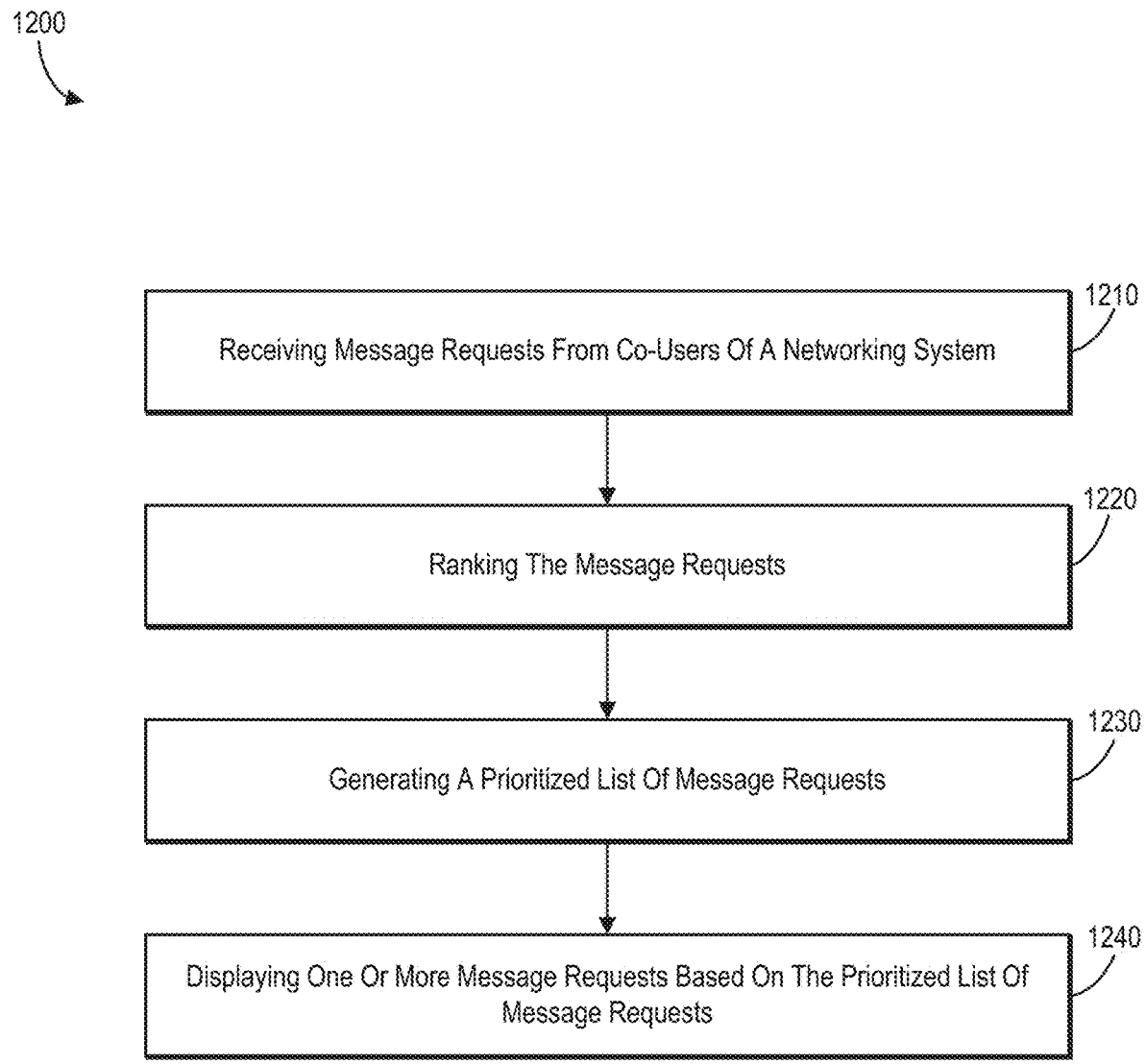
FIG. 12 illustrates a flowchart of a series of acts of generating and providing a prioritized list of message requests in accordance with one or more embodiments.

FIGS. 1-11, the corresponding text, and the examples provide several different systems, methods, techniques, components, and/or devices of the user engagement system 204 in accordance with one or more embodiments. In addition to the above description, one or more embodiments can also be described in terms of flowcharts including acts for accomplishing a particular result. For example, FIG. 12 illustrates flowcharts of example sequences of acts in accordance with one or more embodiments. In addition, FIG. 12 may be performed with more or fewer acts. Further, the acts may be performed in differing orders. Additionally, the acts described herein may be repeated or performed in parallel with one another or parallel with different instances of the same or similar acts.

While FIG. 12 illustrates a series of acts 1200 and a series of acts 1200 according to particular embodiments, alternative embodiments may omit, add to, reorder, and/or modify any of the acts shown. The series of acts of FIG. 12 can be performed as part of a method. Alternatively, a non-transitory computer-readable medium can comprise instructions, when executed by one or more processors, cause a computing device (e.g., a client device and/or a server device) to perform the series of acts of FIG. 12. In still further embodiments, a system performs the acts of FIG. 12.

To illustrate, FIG. 12 shows a flowchart of a series of acts 1200 of generating and providing a prioritized list of message requests in accordance with one or more embodiments. As shown, the series of acts 1200 includes the act 1210 of receiving message requests from co-users of a networking system. For example, the act 1210 can include receiving, for a user of a networking system, a plurality of message requests from co-users of the networking system with whom the user has not actively engaged on the networking system. In various embodiments, a message request corresponds to a message sent to the user and from a co-users with whom the user has not actively engaged on the networking system.

As shown, the series of acts 1200 includes the act 1220 of ranking the message requests. For example, the act 1220 can include ranking the message requests utilizing one or more metrics. In some embodiments, the act 1220 includes determining to rank the message requests when a number of followers associated with the user within the networking system satisfies a predetermined threshold. In one or more embodiments, the one or more metrics include the content item types associated with the message requests, the message content of the message requests, characteristics of the co-users associated with the message requests, or the timestamps of the message requests.

In additional embodiments, ranking the message requests based on the characteristics of the co-users associated with the message requests includes ranking the message requests based on a number of followers of the co-user associated with a message request, a number of posts by the co-user, a verification status of the co-user, an activity history of the co-user, an account type of the co-user, or an affinity (e.g., closeness score) between the co-user and the user.

Further, in some embodiments, the act 1220 include determining that the user is associated with a first content creation account type. In these embodiments, ranking the message requests utilizing one or more metrics includes weighting co-users associated with the message requests and the first content creation account type with greater ranking weight than co-users associated with the message requests and a second content creation account type.

In various embodiments, ranking the message requests based on the co-users associated with the message requests is further based on co-user interactions with content items posted by the user within the networking system. In some embodiments, the co-user interactions by a given co-user of the co-users associated with the message requests with content items posted by the user include a number of likes by the given co-user with the content items posted by the user, a number of comments by the given co-user within comment sections of the content items posted by the user, a number of likes to the comments by the given co-user within the comment sections of the content items posted by the user, and a number of reply comments to the comments by the given co-user within the comment sections of the content items posted by the user.

As shown, the series of acts 1200 also includes an act 1230 of generating a prioritized list of message requests. For example, the act 1230 can include generating a prioritized list of message requests based on the ranking of the message requests. In some embodiments, the act 1230 includes generating a plurality of prioritized list based on different ranked metrics and/or different combinations of ranked metrics.

Additionally, the series of acts 1200 includes an act 1240 of displaying one or more message requests based on the prioritized list of message requests. For example, the act 1240 can include displaying, on a client device associated with the user, one or more message requests of the plurality of message requests in a first graphical user interface based on the prioritized list of message requests. In various embodiments, the first graphical user interface is provided to the user based on detected user input from the user to view pending message requests.

Moreover, the series of acts 1200 can include additional acts. For example, in one or more embodiments, the series of acts 1200 includes acts of detecting a first user input selecting a first message request of the one or more message requests; updating the first graphical user interface to display a first message associated with the first message request; providing, within the first graphical user interface and based on providing the first message, a plurality of options to accept or decline the first message request; and providing, upon detecting a second user input accepting the first message request, additional options to move the first message to a first message repository or a second message repository. In additional embodiments, the series of acts 1200 also includes acts of detecting a user selection to move the first message to the first message repository; moving, in response to the user selection, the first message to the first message repository; and removing, in response to the user selection, the first message request from the prioritized list of message requests.

In some embodiments, the series of acts 1200 includes acts of receiving, from a first co-user of the networking system, a first message for the user; determining a previous engagement between the user and the first co-user associated with the first message; determining an affinity type between the user and the first co-user associated with the first message; and moving the first message to a first message repository of a plurality of message repositories associated with the user based on the previous engagement and the affinity type.

In a number of embodiments, the series of acts 1200 includes acts of detecting the co-users interacting with content items shared by the user within the networking system; determining, for each content item of the content items, a user interaction type based on the co-users interacting with the content item; generating, for each content item, an aggregated interaction notification based on the user interaction type; and providing, to the user in a second graphical user interface, a plurality of aggregated interaction notifications for the content items based on the user interaction types. In some embodiments, the series of acts 1200 includes an additional act of generating the plurality of aggregated activity notifications based on the user having at least a threshold number of followers within the networking system.

In additional embodiments, the series of acts 1200 also includes acts of detecting a user interaction by a first co-user with a first content item shared by the user within the networking system, the detected user interaction associated with a first interaction type; determining that the user has actively engaged the first co-user on the networking system; providing, to the user in the second graphical user interface and based on the determination, a notification of the first co-user interacting with the first content item; and providing, to the user in the second graphical user interface, an aggregated interaction notification of the plurality of aggregated interaction notifications, wherein the aggregated interaction notification corresponds to the first content item and the first interaction type.

In various embodiments, the series of acts 1200 includes acts of detecting a first number of unique co-users that have started following the user within the networking system based on engaging with a first content item shared by the user within the networking system; detecting a second number of unique co-users that have stopped following the user within the networking system based on engaging with the first content item; determining a difference between the first number of unique co-users and the second number of unique co-users; and providing, to the user in a second graphical user interface, growth insights for the first content item including the first number of unique co-users, the second number of unique co-users, and the difference between the first number of unique co-users and the second number of unique co-users. In further embodiments, detecting the first number of unique co-users that have started following the user includes identifying that one or more users (e.g., based on user identifiers) have followed the user multiple times based on engaging with the first content item and have unfollowed the user at least once based on engaging with the first content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
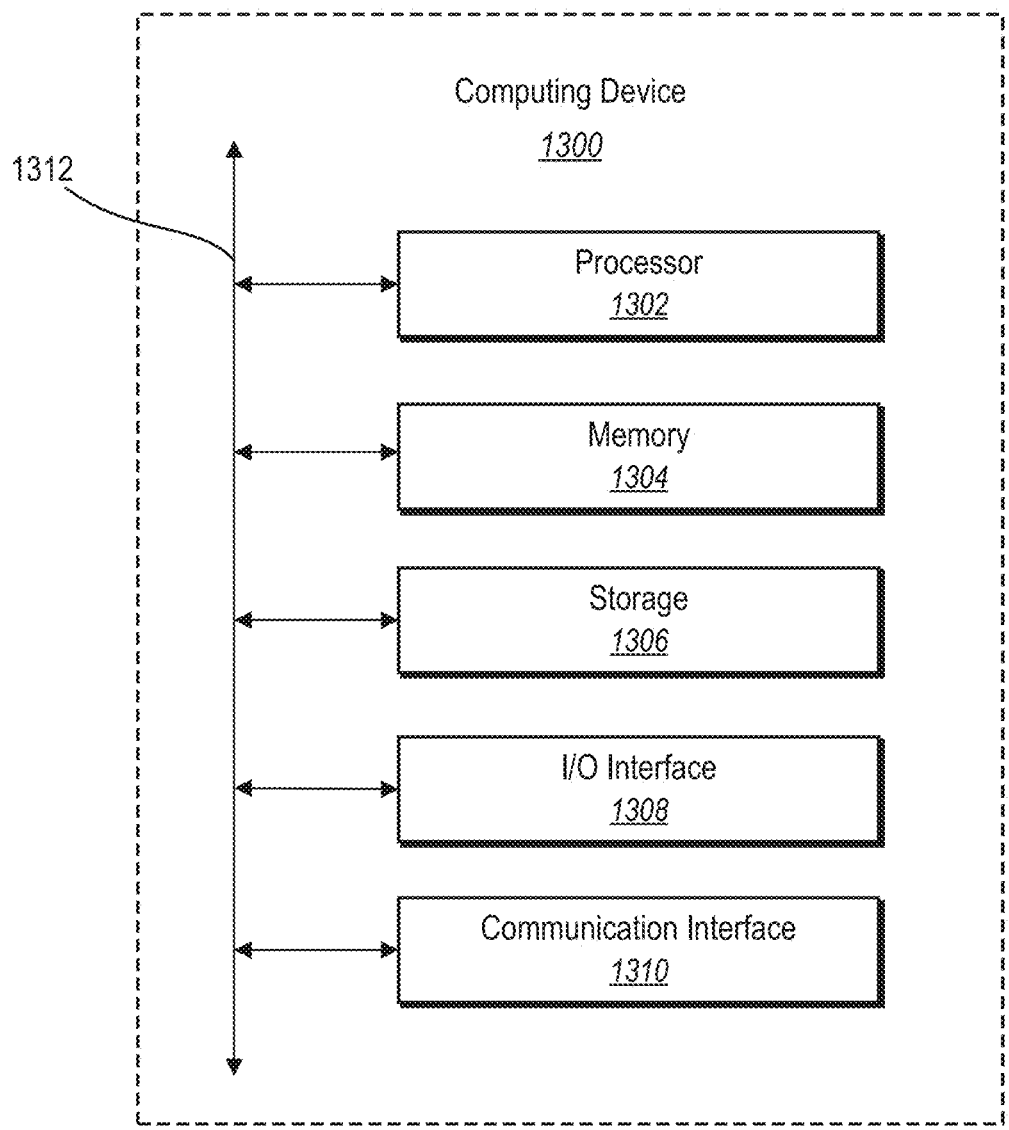
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices such as the computing device 1300 may implement the user engagement system 204. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. While an example computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13. Components of the computing device 1300 shown in FIG. 13 will now be described in additional detail.

In one or more embodiments, the processor 1302 includes hardware for executing instructions, such as those making up a computer program. For example, to execute instructions, the processor 1302 may retrieve (or fetch) the instructions from an internal register, an internal cache, the memory 1304, or the storage device 1306 and decode and execute them. In one or more embodiments, the processor 1302 may include one or more internal caches for data, instructions, or addresses. For example, the processor 1302 may include one or more instruction caches, one or more data caches, and one or more translation lookaside buffers (TLBs). Instructions in the instruction caches may be copies of instructions in the memory 1304 or the storage device 1306.

The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The storage device 1306 includes storage for storing data or instructions. For example, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. The storage device 1306 may include removable or non-removable (or fixed) media, where appropriate. The storage device 1306 may be internal or external to the computing device

1300. In one or more embodiments, the storage device 1306 is non-volatile, solid-state memory. In other embodiments, the storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, another known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (e.g., packet-based communication) between the computing device 1300 and one or more other computing devices or networks. For example, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1310 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 1310 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that connects components of the computing device 1300 to each other. For example, the communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the user engagement system 204 can operate as a social networking system in various embodiments. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 14:
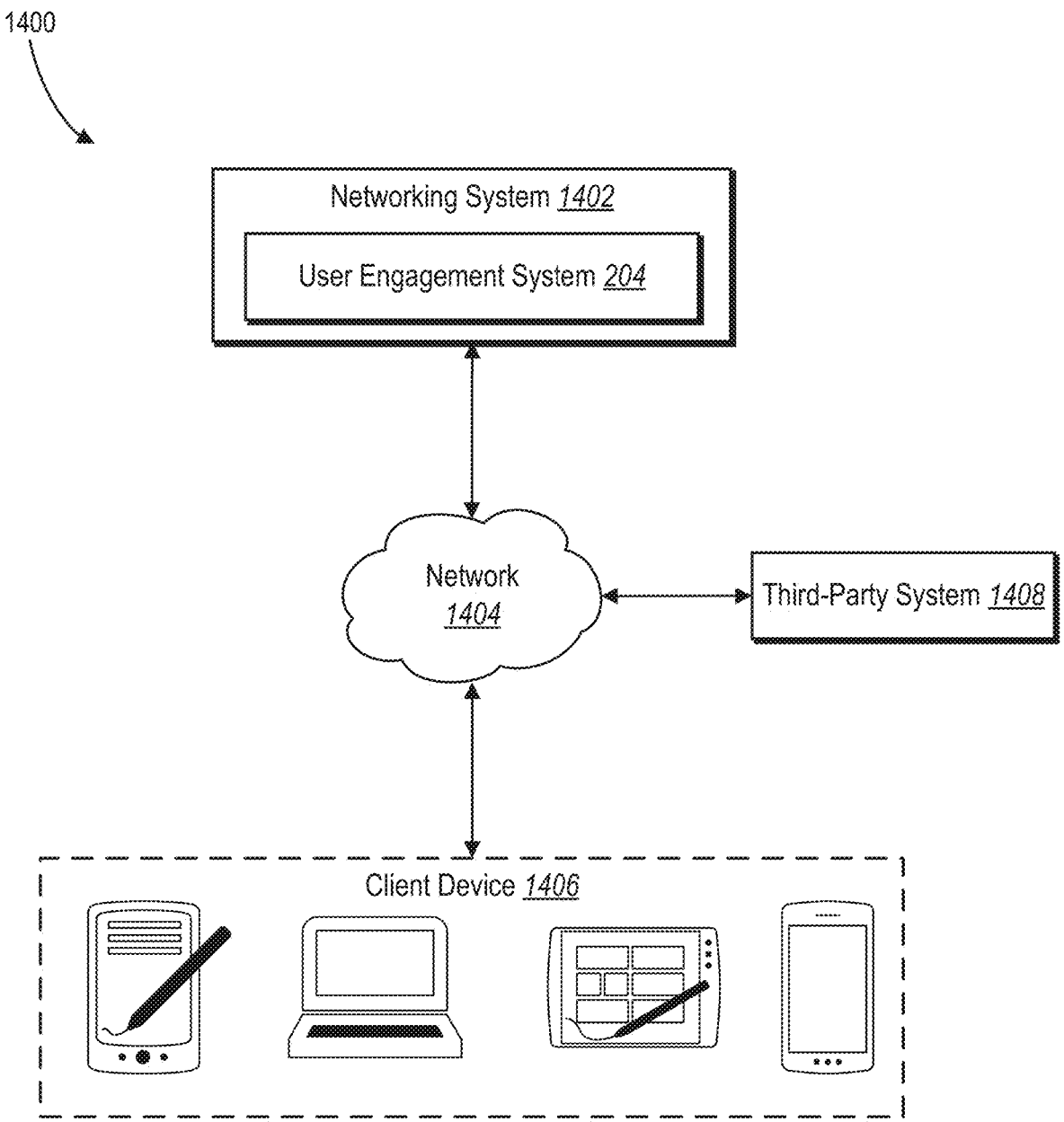
FIG. 14 illustrates an example network environment of a networking system in accordance with one or more embodiments.

FIG. 14 illustrates an example network environment 1400 of a networking system. The network environment 1400 includes a networking system 1402, a client device 1406, and a third-party system 1408 connected to each other by a network 1404. Although FIG. 14 illustrates a particular arrangement of the networking system 1402, the client device 1406, the third-party system 1408, and the network 1404, this disclosure contemplates any suitable arrangement of the devices, systems, and networks. For example, the client device 1406 and the networking system 1402 may be physically or logically co-located with each other in whole, or in part. Moreover, although FIG. 14 illustrates a single client device 1406, the networking system 1402, the third-party system 1408, and the network 1404, this disclosure contemplates any suitable number of devices, systems, and networks.

This disclosure contemplates any suitable network. For example, one or more portions of the network 1404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1404 may include one or more networks.

Links may connect the networking system 1402, the client device 1406, and the third-party system 1408 to the network 1404 or to each other. In particular embodiments, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1400. One or more first links may differ in one or more respects from one or more second links.

In particular embodiments, the client device 1406 may be an electronic device including hardware, software, or embedded logic components or a combination of two or more such components and capable of carrying out the appropriate functionalities implemented or supported by the client device 1406. For example, the client device 1406 may include any of the computing devices discussed above in relation to FIG. 13. The client device 1406 may enable a network user to access the network 1404. The client device 1406 may enable its user to communicate with other users associated with other client devices.

In particular embodiments, the client device 1406 may include a web browser, such as MICROSOFT INTERNET EXPLORER, GOOGLE CHROME, MOZILLA FIREFOX, APPLE SAFARI, and may have one or more add-ons, plug-ins, or other extensions (e.g., toolbars). A user at the client device 1406 may enter a Uniform Resource Locator (URL) or other address directing the web browser to a particular server (such as server, or a server associated with the third-party system 1408), and the web browser may generate a Hypertext Transfer Protocol (HTTP) request and communicate the HTTP request to server. The server may accept the HTTP request and communicate to the client device 1406 one or more Hypertext Markup Language (HTML) files responsive to the HTTP request.

The client device 1406 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the networking system 1402 may be a network-addressable computing system that can host an online network of users (e.g., a social networking system or an electronic messaging system). In some embodiments, such as the illustrated embodiment, the networking system 1402 implements the user engagement system 204.

The networking system 1402 may generate, store, receive, and send networking data, such as user-profile data, concept-profile data, graph information (e.g., social-graph information), or other suitable data related to the online network of users. The networking system 1402 may be accessed by the other components of network environment 1400 either directly or via the network 1404. In particular embodiments, the networking system 1402 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the networking system 1402 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the networking system 1402, the client device 1406, or the third-party system 1408 to manage, retrieve, modify, add, or delete, the information stored in a data store.

In particular embodiments, the networking system 1402 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The networking system 1402 may provide users of the online network of users the ability to communicate and interact with other users. In particular embodiments, users may join the online network of users via the networking system 1402 and then add connections (e.g., relationships) to a number of other users of the networking system 1402 whom they want to be connected to. Herein, the term "friend" may refer to any other user of the networking system 1402 with whom a user has formed a connection, association, or relationship via the networking system 1402.

In particular embodiments, the networking system 1402 may provide users with the ability to take actions on various types of items or objects, supported by the networking system 1402. For example, the items and objects may include groups or social networks to which users of the networking system 1402 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the networking system 1402 or by an external system of the third-party system 1408, which is separate from the networking system 1402 and coupled to the networking system 1402 via the network 1404.

In particular embodiments, the networking system 1402 may be capable of linking a variety of entities. For example, the networking system 1402 may enable users to interact with each other as well as receive content from the third-party systems 1408 or other entities, or to allow users to interact with these entities through an application programming interfaces (API) or other communication channels.

In particular embodiments, the third-party system 1408 may include one or more types of servers, one or more data stores, one or more interfaces, including but not limited to APIs, one or more web services, one or more content sources, one or more networks, or any other suitable components, e.g., that servers may communicate with. The third-party system 1408 may be operated by a different entity from an entity operating the networking system 1402. In particular embodiments, however, the networking system 1402 and the third-party systems 1408 may operate in conjunction with each other to provide social networking services to users of the networking system 1402 or the third-party systems 1408. In this sense, the networking system 1402 may provide a platform, or backbone, which other systems, such as the third-party systems 1408, may use to provide social networking services and functionality to users across the Internet.

In particular embodiments, the third-party system 1408 may include a third-party content object provider. A third-party content object provider may include one or more sources of content objects, which may be communicated to a client device 1406. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the networking system 1402 also includes user-generated content objects, which may enhance a user's interactions with the networking system 1402. User-generated content may include anything a user can add, upload, send, or "post" to the networking system 1402. For example, a user communicates posts to the networking system 1402 from a client device 1406. Posts may include data such as status updates or other textual data, location information, photos, videos, links, music or other similar data or media. Content may also be added to the networking system 1402 by a third-party through a "communication channel," such as a newsfeed or stream.

In particular embodiments, the networking system 1402 may include a variety of servers, sub-systems, programs, modules, logs, and data stores. In particular embodiments, the networking system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The networking system 1402 may also include suitable components such as network interfaces, security mechanisms, load balancers, failover servers, management-and-network-operations consoles, other suitable components, or any suitable combination thereof. In particular embodiments, the networking system 1402 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the networking system 1402 to one or more client device 1406 or one or more the third-party system 1408 via the network 1404. The web server may include a mail server or other messaging functionality for receiving and routing messages between the networking system 1402 and one or more client device 1406. An API-request server may allow the third-party system 1408 to access information from the networking system 1402 by calling one or more APIs. An action logger may be used to receive communications from a web server about a user's actions on or off networking system 1402. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406. Authorization servers may be used to enforce one or more privacy settings of the users of the networking system 1402. A privacy setting of a user determines how particular information associated with a user can be shared. The authorization server may allow users to opt in to or opt out of having their actions logged by the networking system 1402 or shared with other systems (e.g., the third-party system 1408), such as by setting appropriate privacy settings. Third-party-content-object stores may be used to store content objects received from third parties, such as the third-party system 1408. Location stores may be used for storing location information received from client device 1406 associated with users. Advertisement-pricing modules may combine social information, the current time, location information, or other suitable information to provide relevant advertisements, in the form of notifications, to a user.

Figure 15:
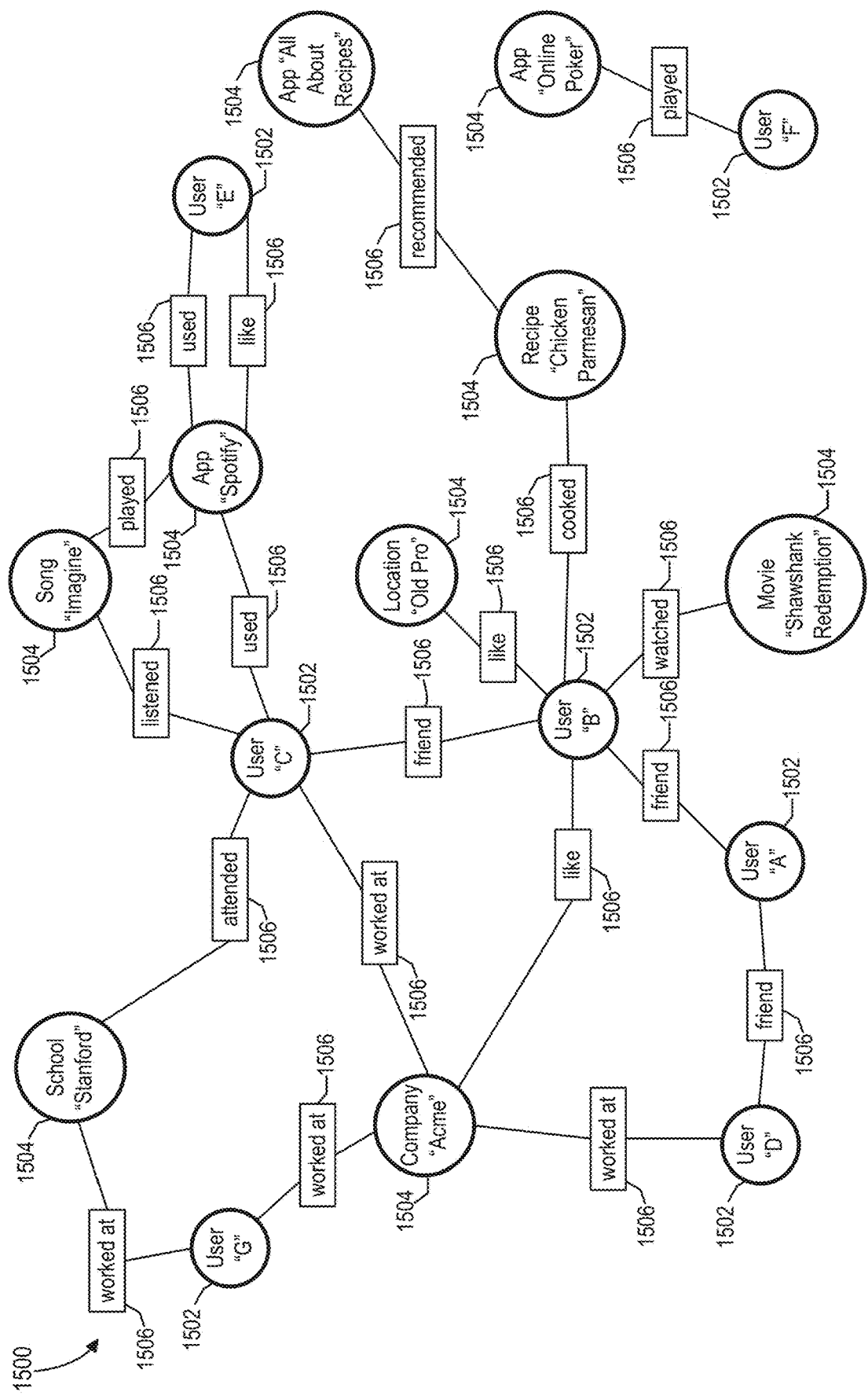
FIG. 15 illustrates a social graph in accordance with one or more embodiments.

FIG. 15 illustrates example social graph 1500. In particular embodiments, the networking system 1402 may store one or more social graphs 1500 in one or more data stores. In particular embodiments, social graph 1500 may include multiple nodes—which may include multiple user nodes 1502 or multiple concept nodes 1504—and multiple edges 1506 connecting the nodes. Example social graph 1500 illustrated in FIG. 15 is shown, for didactic purposes, in a two-dimensional visual map representation. In particular embodiments, the networking system 1402, the client device 1406, or the third-party system 1408 may access social graph 1500 and related social-graph information for suitable applications. The nodes and edges of social graph 1500 may be stored as data objects, for example, in a data store (such as a social-graph database). Such a data store may include one or more searchable or quarriable indexes of nodes or edges of social graph 1500.

In particular embodiments, a user node 1502 may correspond to a user of the networking system 1402. For example, a user may be an individual (human user), an entity (e.g., an enterprise, business, or third-party application), or a group (e.g., of individuals or entities) that interacts or communicates with or over networking system 1402. In particular embodiments, when a user registers for an account with the networking system 1402, the networking system 1402 may create a user node 1502 corresponding to the user and store the user node 1502 in one or more data stores. Users and user nodes 1502 described herein may, where appropriate, refer to registered users and user nodes 1502 associated with registered users. In addition, or as an alternative, users and user nodes 1502 described herein may, where appropriate, refer to users that have not registered with the networking system 1402. In particular embodiments, a user node 1502 may be associated with information provided by a user or information gathered by various systems, including the networking system 1402. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1504 may correspond to a concept. For example, a concept may correspond to a place (e.g., a movie theater, restaurant, landmark, or city); a website (e.g., a website associated with network system 1402 or a third-party website associated with a web-application server); an entity (e.g., a person, business, group, sports team, or celebrity); a resource (e.g., an audio file, video file, digital photo, text file, structured document, or application) which may be located within the networking system 1402 or on an external server, such as a web-application server; real or intellectual property (e.g., a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including the networking system 1402. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more webpages.

In particular embodiments, a node in the social graph 1500 may represent or be represented by a webpage (which may be referred to as a "profile page"). Profile pages may be hosted by or accessible to the networking system 1402. Profile pages may also be hosted on third-party websites associated with a third-party system 1408. For example, a profile page corresponding to a particular external webpage may be the particular external webpage, and the profile page may correspond to a particular concept node 1504. Profile pages may be viewable by all or a selected subset of other users. For example, a user node 1502 may have a corresponding user-profile page in which the corresponding user may add content, make declarations, or otherwise express himself or herself. As another example and not by way of limitation, a concept node 1504 may have a corresponding concept-profile page in which one or more users may add content, make declarations, or express themselves, particularly in relation to the concept corresponding to concept node 1504.

In particular embodiments, a concept node 1504 may represent a third-party webpage or resource hosted by the third-party system 1408. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 1406 to send to the networking system 1402 a message indicating the user's action. In response to the message, the networking system 1402 may create an edge (e.g., an "eat" edge) between a user node 1502 corresponding to the user and a concept node 1504 corresponding to the third-party webpage or resource and store edge 1506 in one or more data stores.

In particular embodiments, a pair of nodes in the social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. For example, a first user may indicate that a second user is a "friend" of the first user. In response to this indication, the networking system 1402 may send a "friend request" to the second user. If the second user confirms the "friend request," networking system 1402 may create an edge 1506 connecting the first user's user node 1502 to the second user's user node 1502 in the social graph 1500 and store edge 1506 as social-graph information in one or more of data stores. In the example of FIG. 15, social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. For example, an edge 1506 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1500 by one or more edges 1506.

In particular embodiments, an edge 1506 between a user node 1502 and a concept node 1504 may represent a particular action or activity performed by a user associated with user node 1502 toward a concept associated with a concept node 1504. For example, as illustrated in FIG. 15, a user may "like," "attended," "played," "listened," "cooked," "worked at," or "watched" a concept, each of which may correspond to an edge type or subtype. A concept-profile page corresponding to a concept node 1504 may include, for example, a selectable "check-in" icon (e.g., a clickable "check-in" icon) or a selectable "add to favorites" icon. Similarly, after a user clicks these icons, the networking system 1402 may create a "favorite" edge or a "check-in" edge in response to a user's action corresponding to a respective action.

As another example and not by way of limitation, a user (user "C") may listen to a particular song ("Ramble On") using a particular application (SPOTIFY, which is an online music application). In this case, the networking system 1402 may create a "listened" edge 1506 and a "used" edge (as illustrated in FIG. 15) between user nodes 1502 corresponding to the user and concept nodes 1504 corresponding to the song and application to indicate that the user listened to the song and used the application.

Moreover, the networking system 1402 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (SPOTIFY) on an external audio file (the song "Imagine"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504.

Furthermore, although this disclosure describes edges between a user node 1502 and a concept node 1504 representing a single relationship, this disclosure contemplates edges between a user node 1502 and a concept node 1504 representing one or more relationships. For example, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "SPOTIFY").

In particular embodiments, the networking system 1402 may create an edge 1506 between a user node 1502 and a concept node 1504 in the social graph 1500. For example, a user viewing a concept-profile page (e.g., by using a web browser or a special-purpose application hosted by the user's client device 1406) may indicate that he or she likes the concept represented by the concept node 1504 by clicking or selecting a "Like" icon, which may cause the user's client device 1406 to send to the networking system 1402 a message indicating the user's liking of the concept associated with the concept-profile page.

In response to the message, the networking system 1402 may create an edge 1506 between user node 1502 associated with the user and concept node 1504, as illustrated by "like" edge 1506 between the user and concept node 1504. In particular embodiments, the networking system 1402 may store an edge 1506 in one or more data stores. In particular embodiments, an edge 1506 may be automatically formed by the networking system 1402 in response to a particular user action. For example, if a first user uploads a picture, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the networking system 1402)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the networking system 1402 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the networking system 1402) or RSVP (e.g., through the networking system 1402) to an event associated with the advertisement. In addition, or as an alternative, an advertisement may include a social networking system context directed to the user. For example, an advertisement may display information about a friend of the user within the networking system 1402 who has taken an action associated with the subject matter of the advertisement.

In particular embodiments, the networking system 1402 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 1408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the networking system 1402 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the networking system 1402 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1402 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the networking system 1402 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the networking system 1402 may calculate a coefficient based on a user's actions. The networking system 1402 may monitor such actions on the online network of users, on the third-party system 1408, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the networking system 1402 may calculate a coefficient based on the user's actions with particular types of content. The content may be associated with the online network of users, the third-party system 1408, or another suitable system. The content may include users, profile pages, posts, news stories, headlines, instant messages, chat room conversations, emails, advertisements, pictures, video, music, other suitable objects, or any combination thereof. The networking system 1402 may analyze a user's actions to determine whether one or more of the actions indicate an affinity for the subject matter, content, other users, and so forth. For example, if a user may make frequently posts content related to "coffee" or variants thereof, the networking system 1402 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the networking system 1402 may calculate a coefficient based on the type of relationship between particular objects. Referencing the social graph 1500, the networking system 1402 may analyze the number and/or type of edges 1506 connecting particular user nodes 1502 and concept nodes 1504 when calculating a coefficient.

For example, user nodes 1502 that are connected by a spouse-type edge (representing that the two users are married) may be assigned a higher coefficient than a user nodes 1502 that are connected by a friend-type edge. In other words, depending upon the weights assigned to the actions and relationships for the particular user, the overall affinity may be determined to be higher for content about the user's spouse than for content about the user's friend.

In particular embodiments, the relationships a user has with another object may affect the weights and/or the ratings of the user's actions with respect to calculating the coefficient for that object. For example, if a user is tagged in a first photo, but merely likes a second photo, the networking system 1402 may determine that the user has a higher coefficient with respect to the first photo than the second photo because having a tagged-in-type relationship with content may be assigned a higher weight and/or rating than having a like-type relationship with content.

In some embodiments, the networking system 1402 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the networking system 1402 may determine that the first user should also have a relatively high coefficient for the particular object.

In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1500. For example, social-graph entities that are closer in the social graph 1500 (i.e., fewer degrees of separation) may have a higher coefficient than entities that are further apart in the social graph 1500.

In particular embodiments, the networking system 1402 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1406 of the user). A first user may be more interested in other users or concepts that are closer to the first user. For example, if a user is one mile from an airport and two miles from a gas station, the networking system 1402 may determine that the user has a higher coefficient for the airport than the gas station based on the proximity of the airport to the user.

In particular embodiments, the networking system 1402 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the networking system 1402 may provide information that is relevant to a user's interests and current circumstances, increasing the likelihood that they will find such information of interest.

In some embodiments, the networking system 1402 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the networking system 1402 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the networking system 1402 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 1408 (e.g., via an API or another communication channel), or from another suitable system. In response to the request, the networking system 1402 may calculate the coefficient (or access the coefficient information if it has previously been calculated and stored).

In various embodiments, the networking system 1402 may measure an affinity with respect to a particular process. Different processes (both internal and external to the online network of users) may request a coefficient for a particular object or set of objects. The networking system 1402 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503093, filed Aug. 11, 2006, U.S. patent application Ser. No. 12/977027, filed Dec. 22, 2010, U.S. patent application Ser. No. 12/978265, filed Dec. 23, 2010, and U.S. patent application Ser. No. 13/632869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 1504 corresponding to a particular photo may have a privacy setting specifying that the photo may only be accessed by users tagged in the photo and their friends.

In particular embodiments, privacy settings may allow users to opt in or opt out of having their actions logged by the networking system 1402 or shared with other systems (e.g., the third-party system 1408). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 1408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the networking system 1402 may send a request to the data store for the object. The request may identify the user associated with the request and may only be sent to the user (or a client device 1406 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, for a user of a networking system, a plurality of message requests from co-users of the networking system with whom the user has not actively engaged on the networking system;
   ranking the plurality of message requests utilizing one or more metrics;
   generating a prioritized list of message requests based on the ranking of the plurality of message requests;
   displaying, on a client device associated with the user, a first set of message requests of the plurality of message requests in a first graphical user interface based on the prioritized list of message requests;
   detecting when the user of the networking system views a message request without responding to the message request and opens a message request without responding to the message request, wherein viewing the message request without responding comprises detecting the user viewing the message request in the prioritized list of message request without selecting or opening the message request;
   decreasing a ranking of a first message request in the prioritized list of message requests based on the user opening the first message request without responding to the first message request;
   decreasing a ranking of a second message request in the prioritized list of message request based on the user viewing the second message request without responding to the second message request;
   re-ranking of the plurality of message requests based on decreasing the ranking of the first message request and decreasing the ranking of the second message request;
   generating an updated prioritized list of message requests based on the re-ranking of the plurality of message requests; and
   displaying, on the client device associated with the user, a second set of message requests of the plurality of message requests in the first graphical user interface based on the updated prioritized list of message requests, wherein the second set of message requests lacks the first message request and includes the second message request.

2. The method of claim 1, wherein the one or more metrics comprise content item types associated with the plurality of message requests, message content of the plurality of message requests, characteristics of the co-users associated with the plurality of message requests, or timestamps of the plurality of message requests.

3. The method of claim 2, wherein ranking the plurality of message requests utilizing one or more metrics comprises, for a given co-user associated with a message request, ranking the plurality of message requests based on a number of followers of the given co-user, a number of posts by the given co-user, a verification status of the given co-user, an activity history of the given co-user, an account type of the given co-user, an affinity between the given co-user and the user, or viewing the message request for a predetermined time.

4. The method of claim 2, further comprising:
determining that the user is associated with a first content creation account type; and
wherein ranking the plurality of message requests utilizing one or more metrics comprises weighting co-users associated with the plurality of message requests and the first content creation account type with greater ranking weight than co-users associated with the plurality of message requests and a second content creation account type.

5. The method of claim 2, wherein:
ranking the plurality of message requests based on the co-users associated with the plurality of message requests is further based on co-user interactions with content items posted by the user within the networking system; and
co-user interactions by a given co-user of the co-users associated with the plurality of message requests with content items posted by the user comprise:
a number of likes by the given co-user with the content items posted by the user;
a number of comments by the given co-user within comment sections of the content items posted by the user;
a number of likes to the comments by the given co-user within the comment sections of the content items posted by the user; and
a number of reply comments to the comments by the given co-user within the comment sections of the content items posted by the user.

6. The method of claim 1, further comprising determining to rank the plurality of message requests when a number of followers of the user within the networking system satisfies a predetermined threshold; and
wherein detecting, when the user of the networking system views a message request, is determined as viewed by the user of the networking system when a predetermined amount of time threshold is reached.

7. The method of claim 1, wherein responding further comprises:
providing options for a message request for the user to select accept, decline, ignore, or not selecting any of the provided options; and
providing, upon receiving a selection accepting the message request, additional options to move the message request to a first message repository or a second message repository.

8. The method of claim 7, further comprising:
detecting a user selection to move the message request to the first message repository;
moving, in response to the user selection, the message request to the first message repository; and
removing, in response to the user selection, the message request from the prioritized list of message requests.

9. The method of claim 1, further comprising:
receiving, from a first co-user of the networking system, a first message for the user;
determining that the user has a previously engaged the first co-user within the networking system; and
moving the first message to a first message repository of a plurality of message repositories associated with the user based on a previous engagement.

10. The method of claim 1, further comprising:
detecting the co-users interacting with content items shared by the user within the networking system;
determining, for each content item of the content items, a user interaction type based on the co-users interacting with the content item;
generating, for each content item, an aggregated interaction notification based on the user interaction type; and
providing, to the user in a second graphical user interface, a plurality of aggregated interaction notifications for the content items based on the user interaction types.

11. The method of claim 10, further comprising:
detecting a user interaction by a first co-user with a first content item shared by the user within the networking system, the detected user interaction associated with a first interaction type;
determining that the user has actively engaged the first co-user on the networking system;
providing, to the user in the second graphical user interface and based on the determination, a notification of the first co-user interacting with the first content item; and
providing, to the user in the second graphical user interface, an aggregated interaction notification of the plurality of aggregated interaction notifications, wherein the aggregated interaction notification corresponds to the first content item and the first interaction type.

12. The method of claim 10, wherein generating the plurality of aggregated interaction notifications for the content item is based on the user having at least a threshold number of followers within the networking system.

13. The method of claim 1, further comprising:
detecting a first number of unique co-users that have started following the user within the networking system based on engaging with a first content item shared by the user within the networking system;
detecting a second number of unique co-users that have stopped following the user within the networking system based on engaging with the first content item;
determining a difference between the first number of unique co-users and the second number of unique co-users; and
providing, to the user in a second graphical user interface, growth insights for the first content item comprising the first number of unique co-users, the second number of unique co-users, and the difference between the first number of unique co-users and the second number of unique co-users.

14. A system comprising:
at least one processor; and
at least one non-transitory computer-readable storage medium storing instructions that, when executed by the at least one processor, cause the system to:
receive, for a user of a networking system, a plurality of message requests from co-users of the networking system with whom the user has not actively engaged on the networking system;
rank the plurality of message requests utilizing one or more metrics;
generate a prioritized list of message requests based on the ranking of the plurality of message requests;
display, on a client device associated with the user, a first set of message requests of the plurality of message requests in a first graphical user interface based on the prioritized list of message requests;
detect, when the user of the networking system views a message request without responding to the message request and opens a message request without responding to the message request, wherein viewing the message request in the prioritized list of message request without selecting or opening the message request;
decrease a ranking of a first message request in the prioritized list of message requests based on the user opening the first message request without responding to the first message request;
decrease a ranking of a second message request in the prioritized list of message request based on the user viewing the second message request without responding to the second message request;
re-rank the plurality of message requests based on decreasing the ranking of the first message request and decreasing the ranking of the second message request;
generate an updated prioritized list of message requests based on the re-ranking of the plurality of message requests; and
display, on the client device associated with the user, a second set of message requests of the plurality of message requests in the first graphical user interface based on the updated prioritized list of message requests, wherein the second set of message requests lacks the first message request and includes the second message request.

15. The system of claim 14, further comprising instructions that cause the system to determine to rank the plurality of message requests when a number of followers associated with the user within the networking system satisfies a predetermined threshold.

16. The system of claim 14, further comprising instructions that cause the system to determine to rank the plurality of message requests based on the characteristics of the co-users associated with the plurality of message requests by ranking the plurality of message requests based on a number of followers of a co-user associated with a message request, a number of posts by the co-user, a verification status of the co-user, an activity history of the co-user, an account type of the co-user, or an affinity between the co-user and the user.

17. A non-transitory computer-readable medium storing instructions that, when executed by at least one processor, cause a computer system to:
receive, for a user of a networking system, a plurality of message requests from co-users of the networking system with whom the user has not actively engaged on the networking system;
rank the plurality of message requests utilizing one or more metrics;
generate a prioritized list of message requests based on the ranking of the plurality of message requests;
display, on a client device associated with the user, a first set of message requests of the plurality of message requests in a first graphical user interface based on the prioritized list of message requests;
detect, when the user of the networking system views a message request without responding to the message request and opens a message request without responding to the message request, wherein viewing the message request without responding comprises detecting the user viewing the message request in the prioritized list of message request without selecting or opening the message request;
decrease a ranking of a first message request in the prioritized list of message requests based on the user opening the first message request without responding to the first message request;
decrease a ranking of a second message request in the prioritized list of message requests based on the user viewing the second message request without responding to the second message request;
re-rank the plurality of message requests based on decreasing the ranking of the first message request and decreasing the ranking of the second message request;
generate an updated prioritized list of message requests based on the re-ranking of the plurality of message requests; and
display, on the client device associated with the user, a second set of message requests of the plurality of message requests in the first graphical user interface based on the updated prioritized list of message requests, wherein the second set of message requests lacks the first message request and includes the second message request.

18. The non-transitory computer-readable medium of claim 17, wherein the one or more metrics comprise content item types associated with the plurality of message requests, message content of the plurality of message requests, characteristics of the co-users associated with the plurality of message requests, or timestamps of the plurality of message requests.

19. The non-transitory computer-readable medium of claim 18, wherein the instructions cause the computer system to rank the plurality of message requests based on the characteristics of the co-users associated with the plurality of message requests by ranking the plurality of message requests based on a number of followers of a co-user associated with a message request, a number of posts by the co-user, a verification status of the co-user, an activity history of the co-user, an account type of the co-user, or an affinity between the co-user and the user.

20. The non-transitory computer-readable medium of claim 19, further comprising instructions that cause the computer system to:
determine that the user is associated with a first content creation account type; and
wherein the instructions cause the computer system to rank the co-users associated with the plurality of message requests by weighting co-users associated with the plurality of message requests and the first content creation account type with greater weight than co-users associated with the plurality of message requests and a second content creation account type.

* * * * *